(12) United States Patent  
Okazaki

(10) Patent No.: US 12,539,914 B2  
(45) Date of Patent: Feb. 3, 2026

(54) GUIDED VEHICLE

(71) Applicant: NAKANISHI METAL WORKS CO., LTD., Osaka (JP)

(72) Inventor: Yoshihiro Okazaki, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 503 days.

(21) Appl. No.: 18/125,585

(22) Filed: Mar. 23, 2023

(65) Prior Publication Data

US 2023/0347975 A1 Nov. 2, 2023

(30) Foreign Application Priority Data

Mar. 30, 2022 (JP) .................................. 2022-055020

(51) Int. Cl.
| | | |
|---|---|---|
| *B62D 11/04* | (2006.01) | |
| *B60B 33/00* | (2006.01) | |
| *B60G 3/14* | (2006.01) | |

(52) U.S. Cl.
CPC ............ *B62D 11/04* (2013.01); *B60B 33/006* (2013.01); *B60G 3/14* (2013.01)

(58) Field of Classification Search
CPC ................ B60G 5/025; B60G 2200/32; B60G 2200/318; B60G 5/043; B60G 5/02; B60G 3/14; B60G 2200/132; B60G 2200/322; B60G 9/02; B62D 61/10; B62D 11/04; B62D 61/00; B60B 33/006
See application file for complete search history.

(56) References Cited

U.S. PATENT DOCUMENTS

| | | | | |
|---|---|---|---|---|
| 2022/0250429 | A1* | 8/2022 | Gartner | ................. B62D 9/002 |
| 2023/0399065 | A1* | 12/2023 | Nagasue | ................ B62D 65/18 |
| 2024/0094738 | A1* | 3/2024 | Nagasue | ................ G01S 17/42 |

FOREIGN PATENT DOCUMENTS

| | | | | | |
|---|---|---|---|---|---|
| CN | 101486382 | B | * | 6/2011 | |
| CN | 105523101 | A | * | 4/2016 | ............ B62D 61/10 |
| CN | 106741295 | A | * | 5/2017 | ............ B62D 61/10 |
| CN | 107235092 | A | * | 10/2017 | ............ B62D 61/10 |
| CN | 110116769 | A | * | 8/2019 | ............ B62D 61/10 |
| CN | 111959632 | A | * | 11/2020 | .......... B62D 57/028 |
| CN | 113247141 | A | * | 8/2021 | ............ B62D 61/10 |

(Continued)

*Primary Examiner* — Paul N Dickson  
*Assistant Examiner* — Matthew D Lee  
(74) *Attorney, Agent, or Firm* — Kratz, Quintos & Hanson, LLP

(57) ABSTRACT

A guided vehicle includes: a first wheel section positioned at a front end portion of a base; and second and third wheel sections which are independent from each other. The first wheel section includes a left-right frame body, and swivel wheels arranged on left and right portions of the left-right frame body. An intermediate position between the swivel wheels in the left-right frame body is supported to be swingable about a front-rear axis relative to the base. Each of the second wheel section and the third wheel section includes a front-rear frame body, and a driving wheel and a swivel wheel which are respectively arranged at a front portion and a rear portion of the front-rear frame body. An intermediate position between the driving wheel and the swivel wheel of each front-rear frame body is supported to be swingable about the left-right axis and the front-rear axis relative to the base.

19 Claims, 17 Drawing Sheets

(56) References Cited

FOREIGN PATENT DOCUMENTS

| CN | 116495077 A | * | 7/2023 | ............. | B62D 61/10 |
| JP | H09-071245 A | | 3/1997 | | |
| WO | WO-9634776 A1 | * | 11/1996 | ........... | B60G 21/073 |

* cited by examiner

GUIDED VEHICLE

FIELD OF THE INVENTION

The present invention relates to a self-propelled guided vehicle provided with left and right driving wheels.

BACKGROUND

As a self-propelled guided vehicle provided with left and right driving wheels, there has been a guided vehicle provided with wheel sections each of which has a driving wheel and a driven wheel respectively arranged at a front and a rear of a front-rear frame body extending in a front-rear direction. The wheel sections are respectively placed on left and right of a base of the guided vehicle. In the guided vehicle, an intermediate position between the driving wheel and the driven wheel in the front-rear frame body is supported so as to be swingable about a left-right axis relative to the base (see, Patent Literature (PTL) 1, for example).

A guided vehicle 10 of PTL 1, which is the self-propelled guided vehicle provided with left and right driving wheels, is configured as follows.

The guided vehicle 10 is provided with swing frames 22 each of which is rotatable around a pivot portion 24 that is a width (left-right) axis, on the respective bottoms of two left and right piece members 14a and 14b extending in a longitudinal (front-rear) direction of a frame member 14. A driving wheel 28 that is driven by a driving device 40 and a swivel wheel 30 that is a driven wheel are respectively arranged at one end and the other end of each of the swing frame 22 in the front-rear direction.

Holding members 38 are provided on the bottoms of end portions, at the other end side of the swing frames 22 in the front-rear direction, of the piece members 14a and 14b of the guided vehicle 10. Swivel wheels 36 as left and right driven wheels are respectively attached to bottom surfaces of the holding members 38.

When traveling on an inclined road and a road with undulations and steps, the guided vehicle 10 causes the driving wheels 28 and swivel wheels 30 to move up and down using the left and right swing frames 22 that can be swingable independently about pivot portions 24 as a fulcrum.

CITATION LIST

Patent Literature

[PTL1] Japanese Unexamined Patent Application Publication No. Hei. 9-71245

SUMMARY

Technical Problem

In the guided vehicle 10 of PTL 1, even if any one of the driving wheels 28 or the swivel wheels 30 provided in one of the swing frames 22 rides on a step, for example, the left and right swing frames 22 can swing individually and the wheels that do not ride on the step touch the ground. Accordingly, PTL 1 discloses that the guided vehicle 10 can cope with unevenness of a road surface and run smoothly even on an inclined road and a road with undulations and steps. Although the configuration of the guided vehicle 10 of PTL 1 provides a certain effect of being able to cope with the unevenness of a road surface, there is room for improvement as follows.

In the guided vehicle 10 of PTL 1, each of the swing frames 22 can swing only around an axis in the left-right direction. Thus, if an inclined surface or an undulation, which is displaced in the front-rear direction, is locally generated on a road surface, the guided vehicle 10 can smoothly travel on the road surface. Here, an inclined surface or undulation, which is displaced in the left-right direction, may be locally generated on the road surface. In such a situation, since the swing frames 22 cannot swing about an axis in the front-rear direction, the swivel wheels 36 as well as the driving wheels 28 and the swivel wheels 30 cannot be sufficiently grounded. In this case, the frictional force of the driving wheels 28 cannot be secured, and sufficient thrust cannot be obtained.

In addition, the left and right swivel wheels 36 are respectively attached to the holding members 38, so as not to move up and down relative to the frame member 14, unlike the driving wheels 28 and swivel wheels 30. Therefore, if one of the swivel wheels 36 is stuck in a groove or runs over a step, the other one of the swivel wheels 36 or one of the swivel wheels 30 may float, causing smooth running to be hindered.

An object of the present invention is to provide a guided vehicle that can run smoothly, even if an inclined surface or an undulation, which is displaced in the front-rear and left-right directions, is locally generated on a road surface.

Solution to Problem

A guided vehicle according to a first aspect of the present invention is provided with left and right driving wheels, and includes a first wheel section located at a front end portion or a rear end portion of a base of the guided vehicle, and a second wheel section and a third wheel section that are independently located on left and right of the base, the second wheel section and the third wheel section being located rearward or frontward of the first wheel section. The first wheel section includes a left-right frame body extending in a left-right direction, and a pair of swivel wheels arranged at left and right portions of the left-right frame body, each of the swivel wheel being a driven wheel. An intermediate position between the swivel wheel at the left portion and the swivel wheel at the right portion in the left-right frame body is supported to be swingable about a front-rear axis relative to the base. Each of the second wheel section and the third wheel section includes a front-rear frame body extending in a front-rear direction, the driving wheel arranged at a front portion or a rear portion of the front-rear frame body, and a swivel wheel arranged at the rear portion or the front portion of the front-rear frame body, the swivel wheel being a driven wheel. An intermediate position between the driving wheel and the swivel wheel in the front-rear frame body is supported to be swingable about a left-right axis and the front-rear axis relative to the base.

A guided vehicle according to a second aspect of the present invention is provided with left and right driving wheels, and includes a first wheel section located at a front end or a rear end of a base of the guided vehicle, and a second wheel section and a third wheel section that are independently located on left and right of the base, the second wheel section and the third wheel section being located rearward or frontward of the first wheel section. The first wheel section includes one or a plurality of swivel wheels located at a center of the base in a left-right direction, each of the swivel wheels being a driven wheel. Each of the second wheel section and the third wheel section includes a front-rear frame body extending in a front-rear direction, the driving wheel arranged at a front portion or a rear portion of the front-rear frame body, and a swivel wheel arranged at the rear portion or the front portion of the front-rear frame body, the swivel wheel being a driven wheel. An intermediate position between the driving wheel and the swivel wheel in the front-rear frame body is supported to be swingable about a left-right axis and a front-rear axis relative to the base.

According to the guided vehicle of the first aspect of the present invention and the guided vehicle of the second aspect of the present invention, the front-rear frame bodies of the second wheel section and the third wheel section can individually swing about the left-right axis relative to the base of the guided vehicle. Accordingly, even if an inclined surface or an undulation, which is displaced in the front-rear direction, is locally generated on the road surface, the driving wheels and the swivel wheels of the second wheel section and the third wheel section can be grounded along the road surface. Therefore, contact areas of the driving wheels and the swivel wheels of the second wheel section and the third wheel section with the road surface increase and sufficient ground contact is ensured, thereby allowing the guided vehicle to smoothly run.

According to the guided vehicle of the first aspect of the present invention and the guided vehicle of the second aspect of the present invention, the front-rear frame bodies can individually swing about the front-rear axis relative to the base. Accordingly, even if an inclined surface or an undulation is locally generated in the left-right direction on the road surface, the driving wheels and the swivel wheels of the second wheel section and the third wheel section can be grounded along the road surface. Therefore, the contact areas of the driving wheels and the swivel wheels of the second wheel section and the third wheel section with the road surface increase and sufficient ground contact is ensured, thereby allowing the guided vehicle to smoothly run.

According to the guided vehicle of the first aspect of the present invention, the left-right frame body of the first wheel section can swing about the front-rear axis relative to the base of the guided vehicle. Accordingly, if one of the swivel wheels at the left and right portions of the left-right frame body is stuck in a groove or runs over a step, the other one of the swivel wheels is grounded. Thus, the guided vehicle can smoothly run.

According to the guided vehicle of the second aspect of the present invention, the swivel wheel in the first wheel section is located at the center of the base in the left-right direction. With this configuration, large spaces can be secured on both the left and right sides of the first wheel section, thereby extremely increasing the degree of freedom in installing and wiring sensors, and the like.

According to the guided vehicle of a third aspect of the present invention, in the guided vehicle of the first aspect of the present invention, an intermediate position between the swivel wheel at the left portion and the swivel wheel at the right portion in the left-right frame body is supported to be further swingable about the left-right axis relative to the base.

According to the guided vehicle of a fourth aspect of the present invention, in the guided vehicle of the second aspect of the present invention, each of the swivel wheels of the first wheel section is supported to be swingable about the left-right axis relative the base.

According to the guided vehicle of the third aspect of the present invention, and the guided vehicle of the fourth aspect of the present invention, the swivel wheel of the first wheel section can swing about the left-right axis relative to the base. Accordingly, even if the swivel wheel of the first wheel section is oriented in the left-right direction (a circumferential direction of the spin turn) during the spin turn, and there is an inclined surface in the front-rear direction (a radial direction of the spin turn), the swivel wheel of the first wheel section can be grounded along the inclined surface. Therefore, a contact area of the swivel wheel of the first wheel section with the ground surface increases and sufficient ground contact is secured, thereby allowing the guided vehicle to smoothly run.

According to the guided vehicle of a fifth aspect of the present invention, in the guided vehicle of the first aspect of the present invention, a mechanism that supports the intermediate position between the driving wheel and the swivel wheel in the front-rear frame body to be swingable about the left-right axis and the front-rear axis relative to the base includes a first hinge that swings about the left-right axis and a second hinge that swings about the front-rear axis, the first hinge and the second hinge being provided between the base and the front-rear frame body.

According to the guided vehicle of a sixth aspect of the present invention, in the guided vehicle of the second aspect of the present invention, a mechanism that supports the intermediate position between the driving wheel and the swivel wheel in the front-rear frame body to be swingable about the left-right axis and the front-rear axis relative to the base includes a first hinge that swings about the left-right axis and a second hinge that swings about the front-rear axis, the first hinge and the second hinge being provided between the base and the front-rear frame body.

According to the guided vehicles of the fifth and sixth aspects of the present invention, each mechanism that supports the front-rear frame body to be swingable includes the first hinge and the second hinge. Accordingly, required swing angles are easily set in two axial directions, and rigidity and strength are easily secured.

According to the guided vehicle of a seventh aspect of the present invention, in the guided vehicle of the first aspect of the present invention, a mechanism that supports the intermediate position between the driving wheel and the swivel wheel in the front-rear frame body to be swingable about the left-right axis and the front-rear axis relative to the base includes an elastic body provided between the base and the front-rear frame body.

According to the guided vehicle of an eighth aspect of the present invention, in the guided vehicle of the second aspect of the present invention, a mechanism that supports the intermediate position between the driving wheel and the swivel wheel in the front-rear frame body to be swingable about the left-right axis and the front-rear axis relative to the base includes an elastic body provided between the base and the front-rear frame body.

According to the guided vehicles of the seventh and eighth aspects of the present invention, each mechanism that supports the front-rear frame body to be swingable is an elastic body. Accordingly, a manufacturing cost can be reduced with a simple structure, and vibration transmission from a road surface to the base of the guided vehicle can be prevented by a cushioning effect of the elastic body.

According to the guided vehicle of a ninth aspect of the present invention, in the guided vehicle of the first aspect of the present invention, length of the left-right frame body in the left-right direction is shorter than an interval between the front-rear frame body of the second wheel section and the front-rear frame body of the third wheel section in the left-right direction.

According to the guided vehicle of the ninth aspect of the present invention, the length in the left-right direction of the left-right frame body of the first wheel section is shorter than the interval in the left-right direction between the front-rear frame bodies on the left and right sides. With this configuration, spaces can be secured on both the left and right of the first wheel section, thereby increasing the degree of freedom in installing and wiring sensors, and the like.

According to the guided vehicles of tenth and eleventh aspects of the present invention, in the guided vehicle of the first aspect of the present invention, a first distance, a second distance, and one of a third distance and a fourth distance, are identical or nearly identical. The first distance is between a rotation center axis of the driving wheel of the second wheel section and a vertical support axis of the swivel wheel of the second wheel section, in the front-rear direction. The second distance is between a rotation center axis of the driving wheel of the third wheel section and a vertical support axis of the swivel wheel of the third wheel section, in the front-rear direction. The third distance is between a vertical support axis of the swivel wheel of the first wheel section and the rotation center axis of the driving wheel of each of the second wheel section and the third wheel section, in the front-rear direction. The fourth distance is between the vertical support axis of the swivel wheel of the first wheel section and the vertical support axis of the swivel wheel of each of the second wheel section and the third wheel section, in the front-rear direction. A center or a vicinity of the center in the front-rear direction between the rotation center axis of the driving wheel and the vertical support axis of the swivel wheel in the front-rear frame body is supported to be swingable about the left-right axis and the front-rear axis relative to the base.

According to the guided vehicles of twelfth and thirteenth aspects of the present invention, in the guided vehicle of the third aspect of the present invention, a first distance, a second distance, and one of a third distance and a fourth distance, are identical or nearly identical. The first distance is between a rotation center axis of the driving wheel of the second wheel section and a vertical support axis of the swivel wheel of the second wheel section, in the front-rear direction. The second distance is between a rotation center axis of the driving wheel of the third wheel section and a vertical support axis of the swivel wheel of the third wheel section, in the front-rear direction. The third distance is between a vertical support axis of the swivel wheel of the first wheel section and the rotation center axis of the driving wheel of each of the second wheel section and the third wheel section, in the front-rear direction. The fourth distance is between the vertical support axis of the swivel wheel of the first wheel section and the vertical support axis of the swivel wheel of each of the second wheel section and the third wheel section, in the front-rear direction. A center or a vicinity of the center in the front-rear direction between the rotation center axis of the driving wheel and the vertical support axis of the swivel wheel in the front-rear frame body is supported to be swingable about the left-right axis and the front-rear axis relative to the base.

According to the guided vehicles of fourteenth and fifteenth aspects of the present invention, in the guided vehicle of the fifth aspect of the present invention, a first distance, a second distance, and one of a third distance and a fourth distance, are identical or nearly identical. The first distance is between a rotation center axis of the driving wheel of the second wheel section and a vertical support axis of the swivel wheel of the second wheel section, in the front-rear direction. The second distance is between a rotation center axis of the driving wheel of the third wheel section and a vertical support axis of the swivel wheel of the third wheel section, in the front-rear direction. The third distance is between a vertical support axis of the swivel wheel of the first wheel section and the rotation center axis of the driving wheel of each of the second wheel section and the third wheel section, in the front-rear direction. The fourth distance is between the vertical support axis of the swivel wheel of the first wheel section and the vertical support axis of the swivel wheel of each of the second wheel section and the third wheel section, in the front-rear direction. A center or a vicinity of the center in the front-rear direction between the rotation center axis of the driving wheel and the vertical support axis of the swivel wheel in the front-rear frame body is supported to be swingable about the left-right axis and the front-rear axis relative to the base.

According to the guided vehicles of sixteenth and seventeenth aspects of the present invention, in the guided vehicle of the seventh aspect of the present invention, a first distance, a second distance, and one of a third distance and a fourth distance, are identical or nearly identical. The first distance is between a rotation center axis of the driving wheel of the second wheel section and a vertical support axis of the swivel wheel of the second wheel section, in the front-rear direction. The second distance is between a rotation center axis of the driving wheel of the third wheel section and a vertical support axis of the swivel wheel of the third wheel section, in the front-rear direction. The third distance is between a vertical support axis of the swivel wheel of the first wheel section and the rotation center axis of the driving wheel of each of the second wheel section and the third wheel section, in the front-rear direction. The fourth distance is between the vertical support axis of the swivel wheel of the first wheel section and the vertical support axis of the swivel wheel of each of the second wheel section and the third wheel section, in the front-rear direction. A center or a vicinity of the center in the front-rear direction between the rotation center axis of the driving wheel and the vertical support axis of the swivel wheel in the front-rear frame body is supported to be swingable about the left-right axis and the front-rear axis relative to the base.

According to the guided vehicles of eighteenth and nineteenth aspects of the present invention, in the guided vehicle of the ninth aspect of the present invention, a first distance, a second distance, and one of a third distance and a fourth distance, are identical or nearly identical. The first distance is between a rotation center axis of the driving wheel of the second wheel section and a vertical support axis of the swivel wheel of the second wheel section, in the front-rear direction. The second distance is between a rotation center axis of the driving wheel of the third wheel section and a vertical support axis of the swivel wheel of the third wheel section, in the front-rear direction. The third distance is between a vertical support axis of the swivel wheel of the first wheel section and the rotation center axis of the driving wheel of each of the second wheel section and the third wheel section, in the front-rear direction. The fourth distance is between the vertical support axis of the swivel wheel of the first wheel section and the vertical support axis of the swivel wheel of each of the second wheel section and the third wheel section, in the front-rear direction. A center or a vicinity of the center in the front-rear direction between the rotation center axis of the driving wheel and the vertical support axis of the swivel wheel in the front-rear frame body is supported to be swingable about the left-right axis and the front-rear axis relative to the base.

According to the guided vehicles of the tenth to nineteenth aspects of the present invention, the driving wheels can reliably transmit driving force to the road surface and allow the guided vehicle to run, while a load is applied to the six wheels including the driving wheels and the swivel wheels evenly or substantially evenly. The load is evenly or substantially evenly applied to the six wheels. Accordingly, the load on the swivel wheels can be reduced, and the driving wheels are not overloaded. Therefore, the swivel wheels and the driving wheels, which have a minimum allowable load, can be used, so that the cost of the wheels can be reduced.

The "base" of the guided vehicle according to the present invention is a structural member of the guided vehicle, and includes structures in which frames, rods, and the like, are combined.

The "intermediate position" in the phrase of "intermediate position between the swivel wheel at the left portion and the swivel wheel at the right portion" in the guided vehicle of the present invention may be a center position between the swivel wheel at the left portion and the swivel wheel at the right portion, and may not be the center position. In other words, the "intermediate position" is merely required to be a position between the swivel wheel at the left portion and the swivel wheel at the right portion.

The "intermediate position" in the phrase of "intermediate position between the driving wheel and the swivel wheel" in the guided vehicle of the present invention may be a center position between the driving wheel and the swivel wheel, and may not be the center position. In other words, the "intermediate position" is merely required to be a position between the driving wheel and the swivel wheel.

The "center of the base in a left-right direction" in the phrase of "one or a plurality of swivel wheels located at a center of the base in a left-right direction, each of the swivel wheels being a driven wheel" of the guided vehicle of the present invention indicates an idea including a center in the left-right direction and the vicinity of the center. The "swivel wheel" includes, for example, a plurality of wheels arranged along the direction of the rotation center axis about which the wheels rotate, for heavy loads. The "plurality of swivel wheels" may be, for example, three "swivel wheels" arranged in a horizontal plane. It is preferable that "one or a plurality of swivel wheels, each of the swivel wheels being a driven wheel" are symmetrical with respect to a vertical plane at the center of the base of the guided vehicle in the left-right direction, with the "swivel wheels" being oriented in the front-rear direction, from the viewpoint of balance when the guided vehicle turns to the left or to the right.

Advantageous Effects

According to the guided vehicle of the present invention described above, the front-rear frame bodies of the second wheel section and the third wheel section can individually swing about the left-right axis relative to the base of the guided vehicle. Accordingly, even if an inclined surface or an undulation, which is displaced in the front-rear direction, is locally generated on the road surface, the driving wheels and the swivel wheels of the second wheel section and the third wheel section can be grounded along the road surface. Therefore, the contact areas of the driving wheels and the swivel wheels of the second wheel section and the third wheel section with the road surface increase and sufficient ground contact is ensured, so that the guided vehicle can run smoothly.

In addition, the front-rear frame bodies of the second wheel section and the third wheel section can individually swing about the front-rear axis relative to the base. Accordingly, even if the road surface is locally inclined or undulated in the left-right direction, the driving wheels and the swivel wheels of the second wheel section and the third wheel section can be grounded along the road surface. Therefore, the contact areas of the driving wheels and the swivel wheels of the second wheel portion and the third wheel portion with the road surface increase and sufficient ground contact is ensured, so that the guided vehicle can run smoothly.

DESCRIPTION OF EMBODIMENTS

Figure 1:
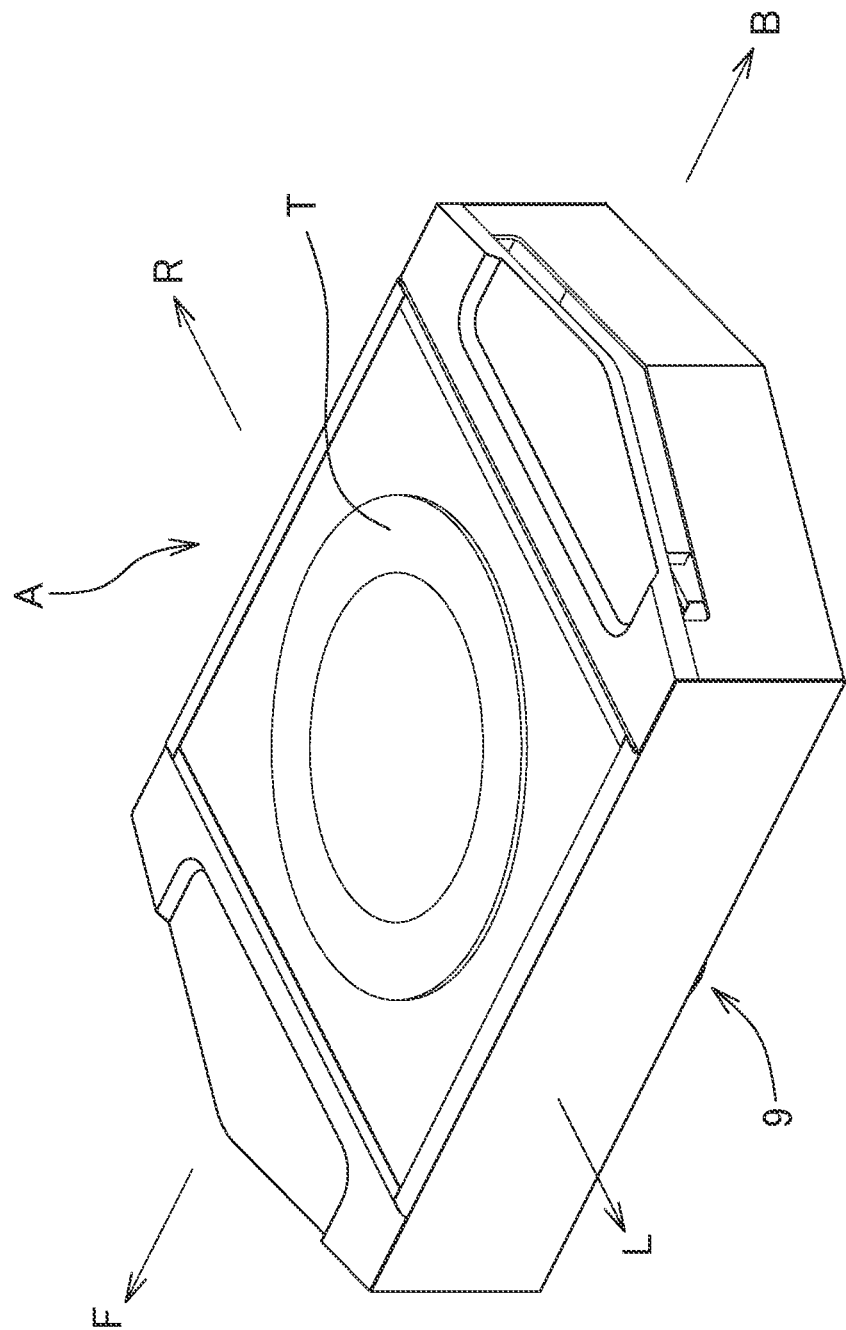
FIG. 1 is a perspective view of a guided vehicle according to an embodiment of the present invention.

Hereinafter, embodiments of the present invention are described with reference to the accompanying drawings. In the embodiments of the present invention, front, rear, left, and right are defined with reference to an orientation of a guided vehicle, for the sake of convenience. Specifically, the arrows F, B, L, and R in the drawings respectively indicate the front, rear, left, and right, and a front view shows the guided vehicle viewed from the front.

<Guided Vehicle>

Figure 2:
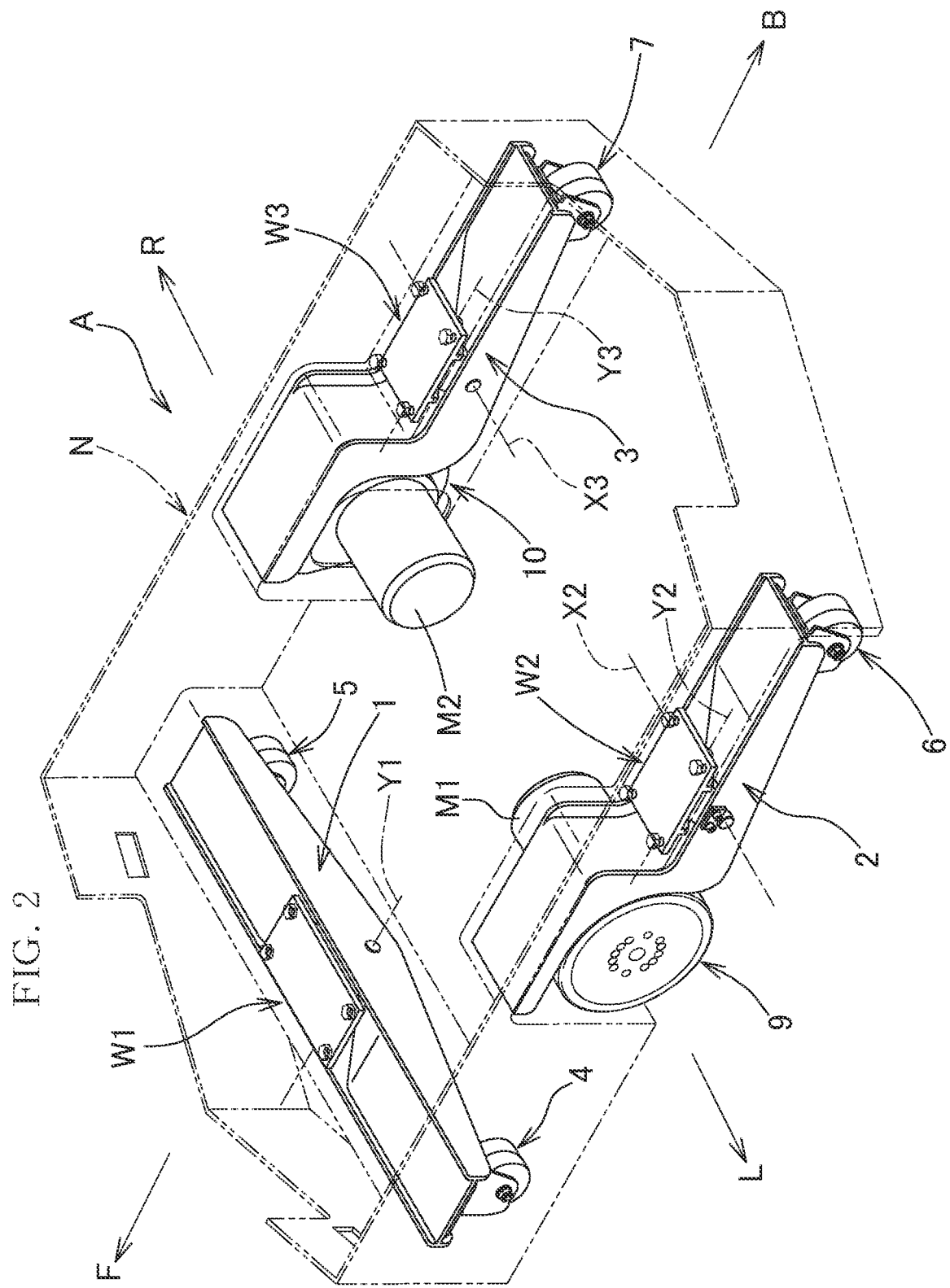
FIG. 2 is a perspective view showing a first wheel section, a second wheel section, and a third wheel section in the guided vehicle.

A guided vehicle A according to an embodiment of the present invention, which is shown in the perspective views of FIGS. 1 and 2, is an automated guided vehicle (AGV) that is self-propelled without a track, for example. The guided vehicle A is provided with a lift table T on which a load (not shown) is placed, and travels by driving left and right driving wheels 9 and 10.

The left and right driving wheels 9 and 10 are positioned substantially at the center of the guided vehicle A in a front-rear direction, for example. When the left and right driving wheels 9 and 10 are rotated in a same direction at same speed, the guided vehicle A moves forward or rearward. When the left and right driving wheels 9 and 10 are rotated in the same direction at different speeds, the guided vehicle A turns left or right while moving forward or rearward. When the left and right driving wheels 9 and 10 are rotated in opposite directions at same speed, the guided vehicle A rotates on the spot around a center of rotation between the left and right driving wheels 9 and 10, and makes a spin turn.

The driving wheel 9 is driven by a driving device M1, and the driving wheel 10 is driven by a driving device M2. Each of the driving devices M1 and M2 includes, for example, a motor and a decelerator.

<First to Third Wheel Sections>

Figure 3A:
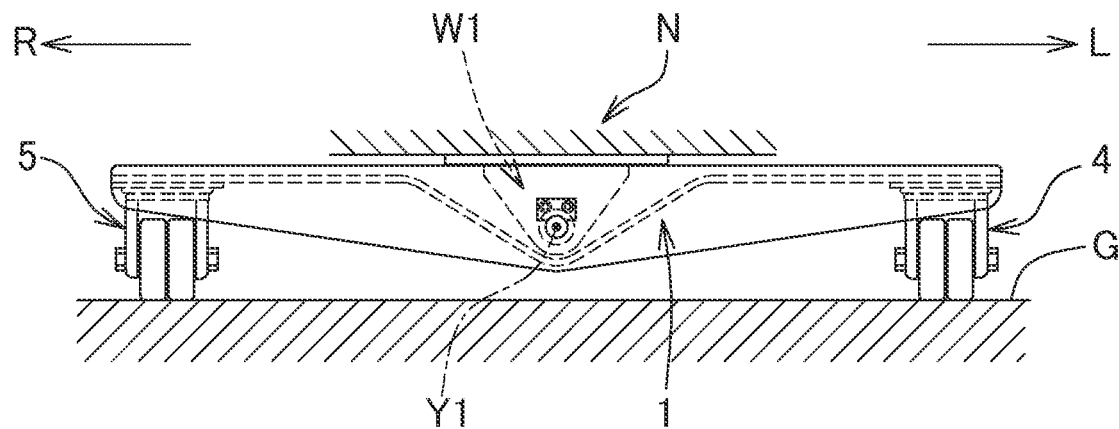
FIG. 3A is a front view of the first wheel section.

As shown in the perspective view of FIG. 2 and the front view of FIG. 3A, the guided vehicle A includes a first wheel section W1, a second wheel section W2, and a third wheel section W3 on a bottom surface of a base N. The first wheel section W1 is located at a front end portion of the base N, the second wheel section W2 is located at a left end portion of the base N in a rear side from the first wheel section W1, and the third wheel section W3 is located at a right end portion of the base N in the rear side from the wheel section W1.

The first wheel section W1 includes a left-right frame body 1 extending in the left-right direction, and swivel wheels 4 and 5 as driven wheels respectively disposed on the left and right portions of the left-right frame body 1. An intermediate position between the swivel wheel 4 and the swivel wheel 5 in the left-right frame body 1 is supported so as to be swingable about a front-rear axis Y1 relative to the base N. A mechanism for supporting the left-right frame body 1 of the first wheel section W1 so as to be swingable about the front-rear axis Y1 relative to the base N is, for example, a hinge provided between the base N and the left-right frame body 1.

The second wheel section W2 includes a front-rear frame body 2 extending in the front-rear direction, the driving wheel 9, and a swivel wheel 6 as the driven wheel. The driving wheel 9 and the swivel wheel 6 are respectively disposed at, for example, front and rear portions of the front-rear frame body 2. An intermediate position between the driving wheel 9 and the swivel wheel 6 in the front-rear frame body 2 is supported so as to be swingable about a left-right axis X2 and a front-rear axis Y2, relative to the base N. In FIG. 2, the swivel wheel 6 may be disposed at the front portion of the front-rear frame body 2, and the driving wheel 9 may be disposed at the rear portion of the front-rear frame body 2.

The third wheel section W3 includes a front-rear frame body 3 extending in the front-rear direction, the driving wheel 10 and a swivel wheel 7 as the driven wheel. The driving wheel 10 and the swivel wheel 7 are respectively disposed at, for example, front and rear portions of the front-rear frame body 3. An intermediate position between the driving wheel 10 and the swivel wheel 7 in the front-rear frame body 3 is supported so as to be swingable about a left-right axis X3 and a front-rear axis Y3, relative to the base N. In FIG. 2, the swivel wheel 7 may be disposed at the front portion of the front-rear frame body 3, and the driving wheel 10 may be disposed at the rear portion of the front-rear frame body 3.

<Modified Example of First Wheel Section>

Figure 3B:
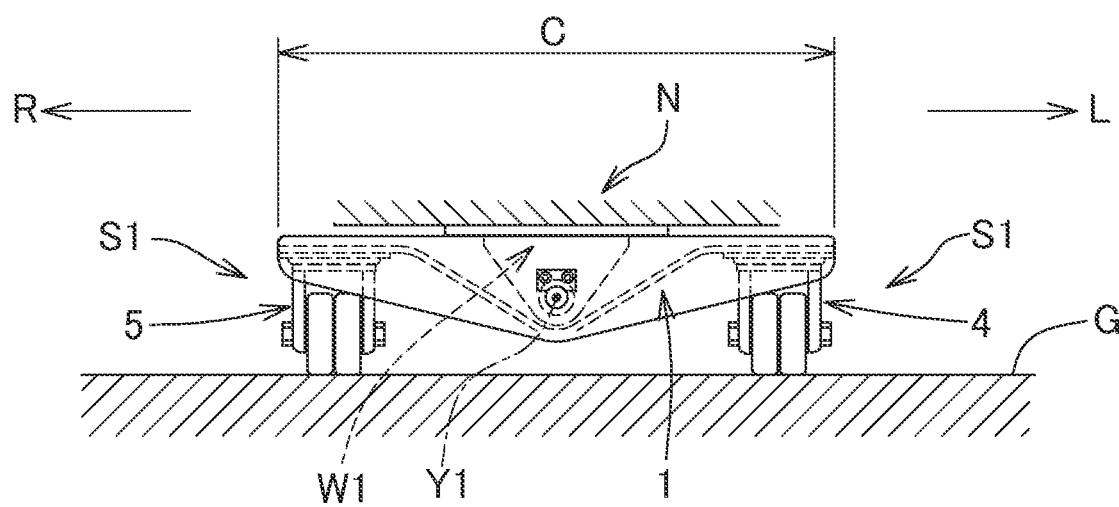
FIG. 3B is a front view of a modified example of the first wheel section, in which length of a left-right frame body in a left-right direction is shortened.
Figure 4:
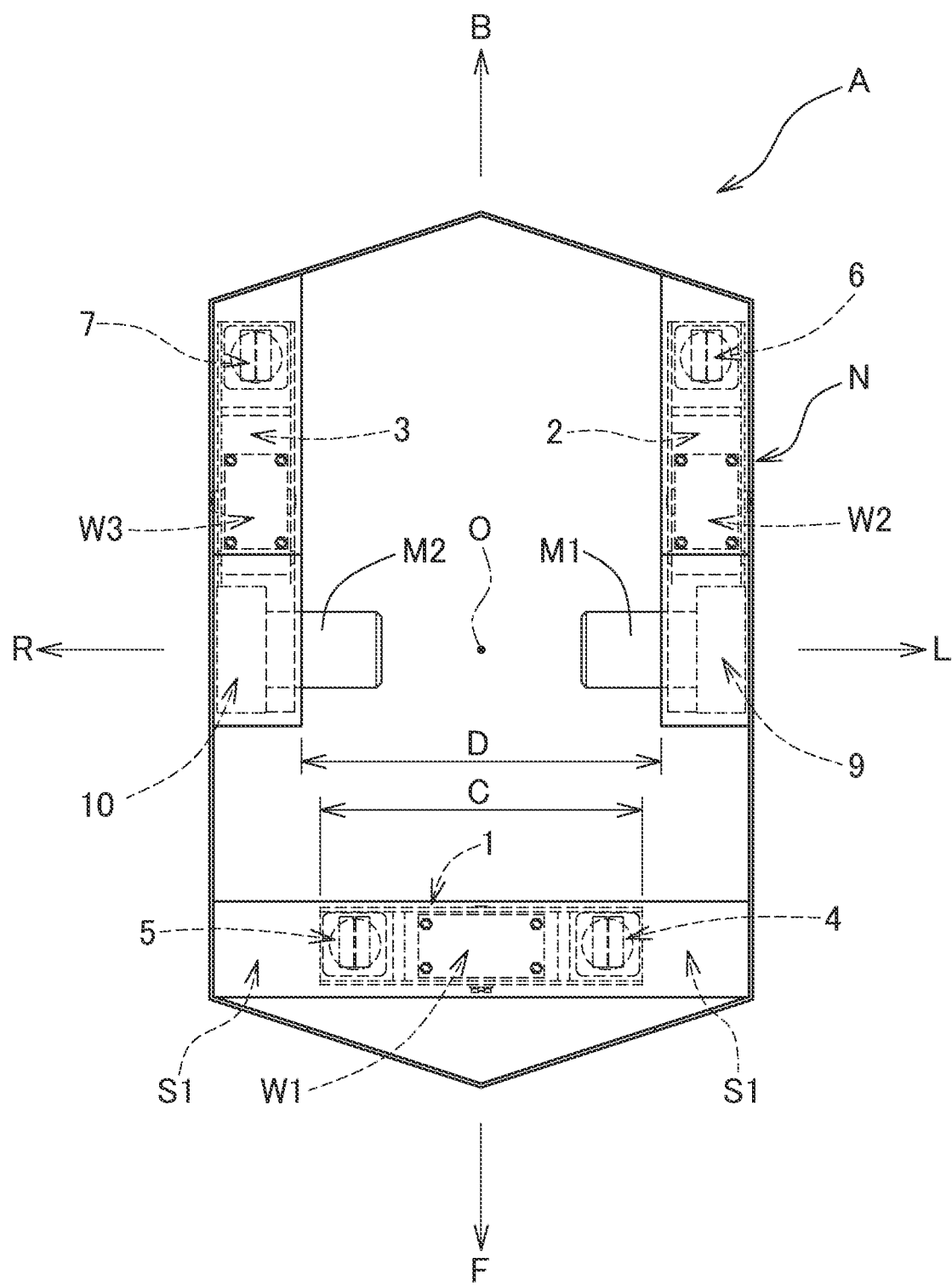
FIG. 4 is a plan view showing the modified example of the first wheel section shown in FIG. 3B, the second wheel section, and the third wheel section.

The left-right frame body 1 of the first wheel section W1 shown in the front view of FIG. 3B and the plan view of FIG. 4 is shorter than the left-right frame body 1 shown in the front view of FIG. 3A. In the modified example, length C of the left-right frame body 1 in the left-right direction is made shorter than an interval D between the left and right front-rear frame bodies 2 and 3, in the left-right direction (C<D). As a result, spaces S1 can be secured on both the left and right sides of the first wheel section W1, thereby increasing the degree of freedom in installing and wiring sensors, and the like.

Figure 3C:
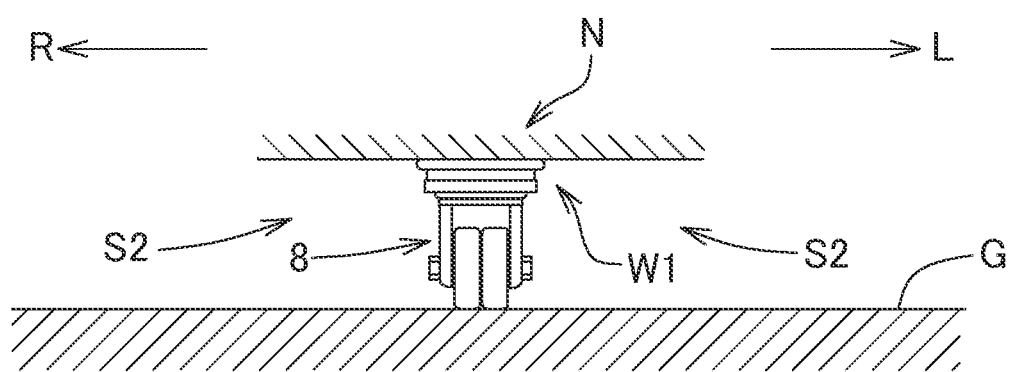
FIG. 3C is a front view of a modified example of the first wheel section, in which the left-right frame body is removed.
Figure 8:
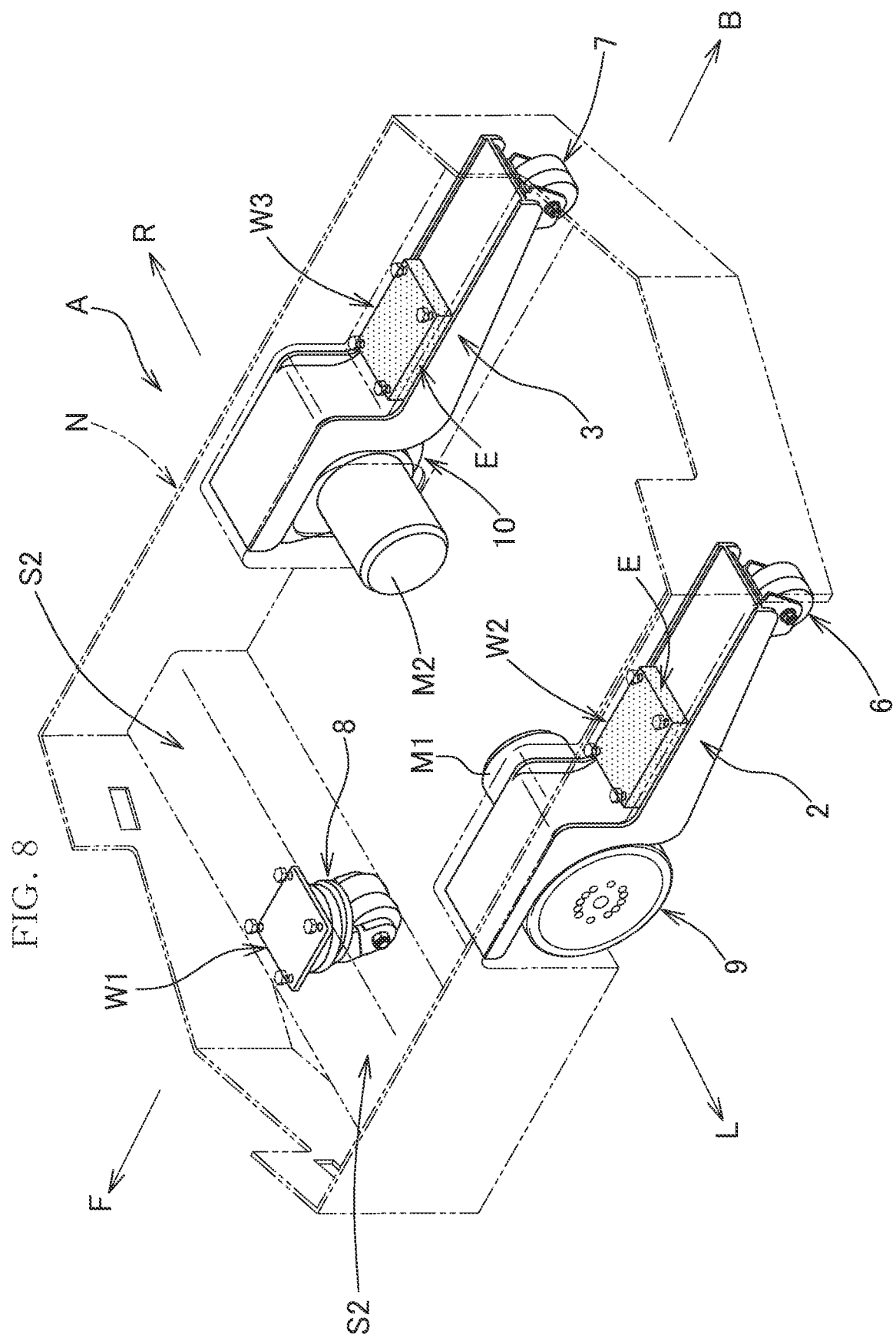
FIG. 8 is a perspective view showing the modified example of the first wheel section shown in FIG. 3C, a modified example of the second wheel section, and a modified example of the third wheel section.

As shown in the front view of FIG. 3C and the perspective view of FIG. 8, the first wheel section W1 may only include the swivel wheel 8 disposed at the center of the base N in the left-right direction, without the left-right frame body 1. With this configuration, large spaces S2 can be secured on both the left and right sides of the first wheel section W1, thereby greatly increasing the degree of freedom in installing and wiring sensors, and the like.

<Example of Mechanisms for Supporting Front-Rear Frame Bodies of Second and Third Wheel Sections so as to be Swingable about Two Axes>

Figure 5:
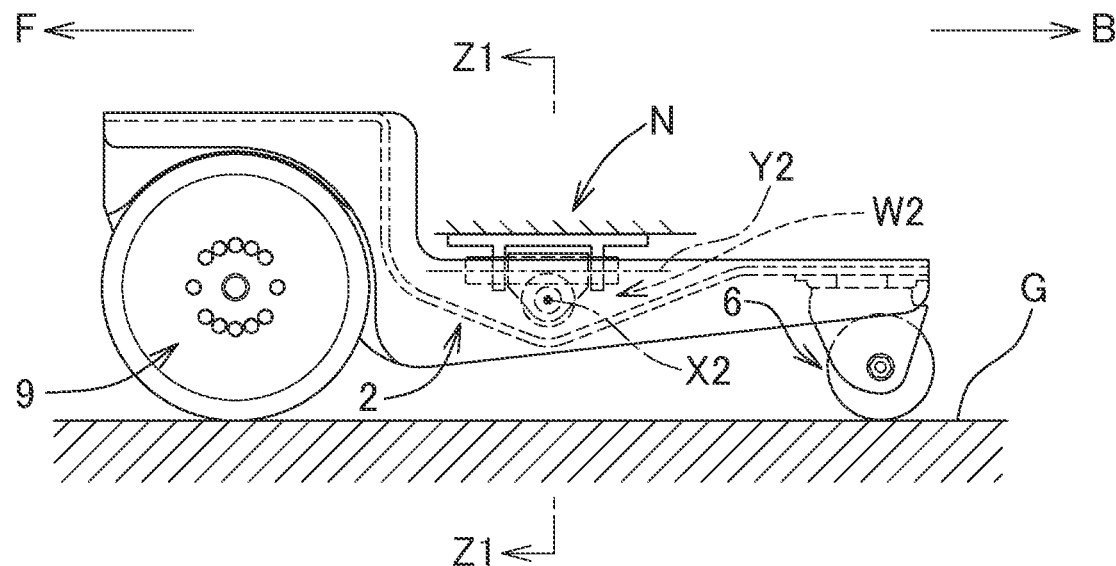
FIG. 5 is a right side view of the second wheel section shown in FIG. 2.
Figure 6:
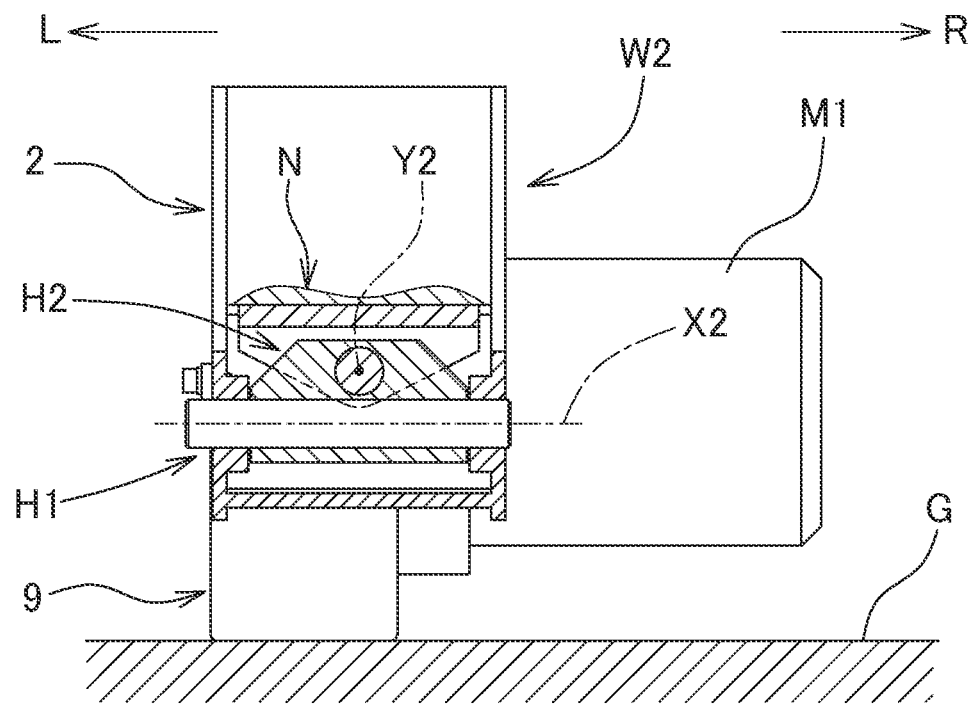
FIG. 6 is a cross-sectional view taken along an arrow Z1-Z1 in FIG. 5.
Figure 7:
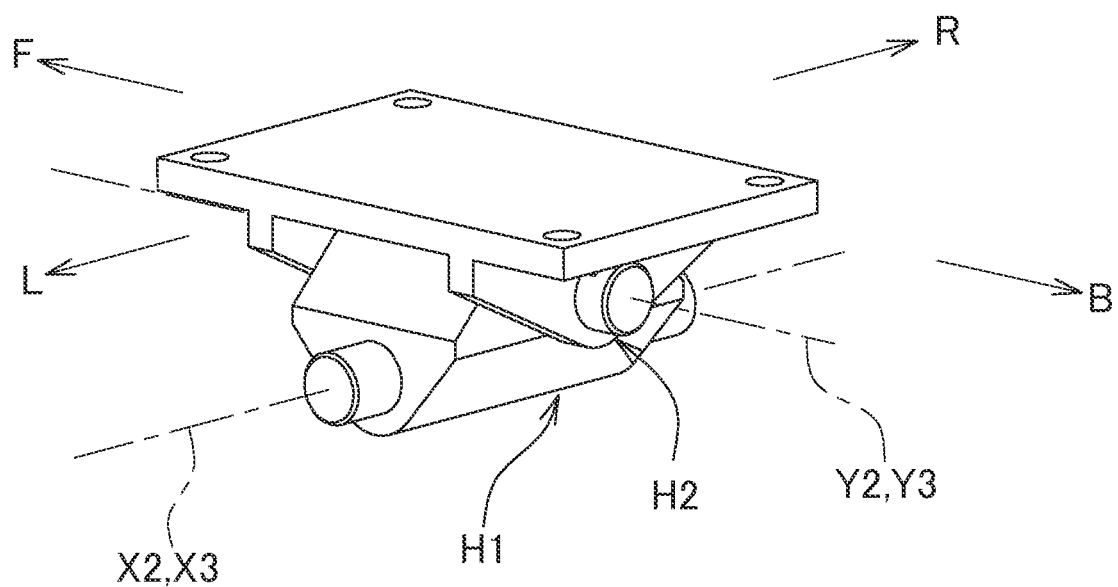
FIG. 7 is a perspective view of a first hinge and a second hinge.

As shown in the right side view of FIG. 5, the cross-sectional view of FIG. 6, and the perspective view of FIG. 7, a mechanism for supporting the front-rear frame body 2 of the second wheel section W2 so as to be biaxially swingable about the left-right axis X2 and the front-rear axis Y2 relative to the base N includes, for example, a first hinge H1 that swings about the left-right axis X2 and a second hinge H2 that swings about the front-rear axis Y2. The first and second hinges H1 and H2 are provided between the base N and the front-rear frame body 2.

A mechanism for supporting the front-rear frame body 3 of the third wheel section W3 so as to be biaxially swingable about the left-right axis X3 and the front-rear axis Y3 relative to the base N includes the first hinge H1 and the second hinge H2, as in the second wheel section W2.

The hinges H1 and H2, which are configured with two offset axes, are used as the mechanisms for supporting the front-rear frame bodies 2 and 3 in a biaxially swingable manner, so that required swing angles are easily set in two axial directions, and rigidity and strength are easily secured. In addition, even if a center of gravity of the guided vehicle A containing a tall load on the lifting table T becomes high, the hinges H1 and H2 can withstand shaking during travel. Therefore, the guided vehicle A can travel stably.

<Modified Examples of Mechanisms for Supporting Front-Rear Frame Bodies of Second and Third Wheel Sections so as to be Swingable about Two Axes>

Figure 9:
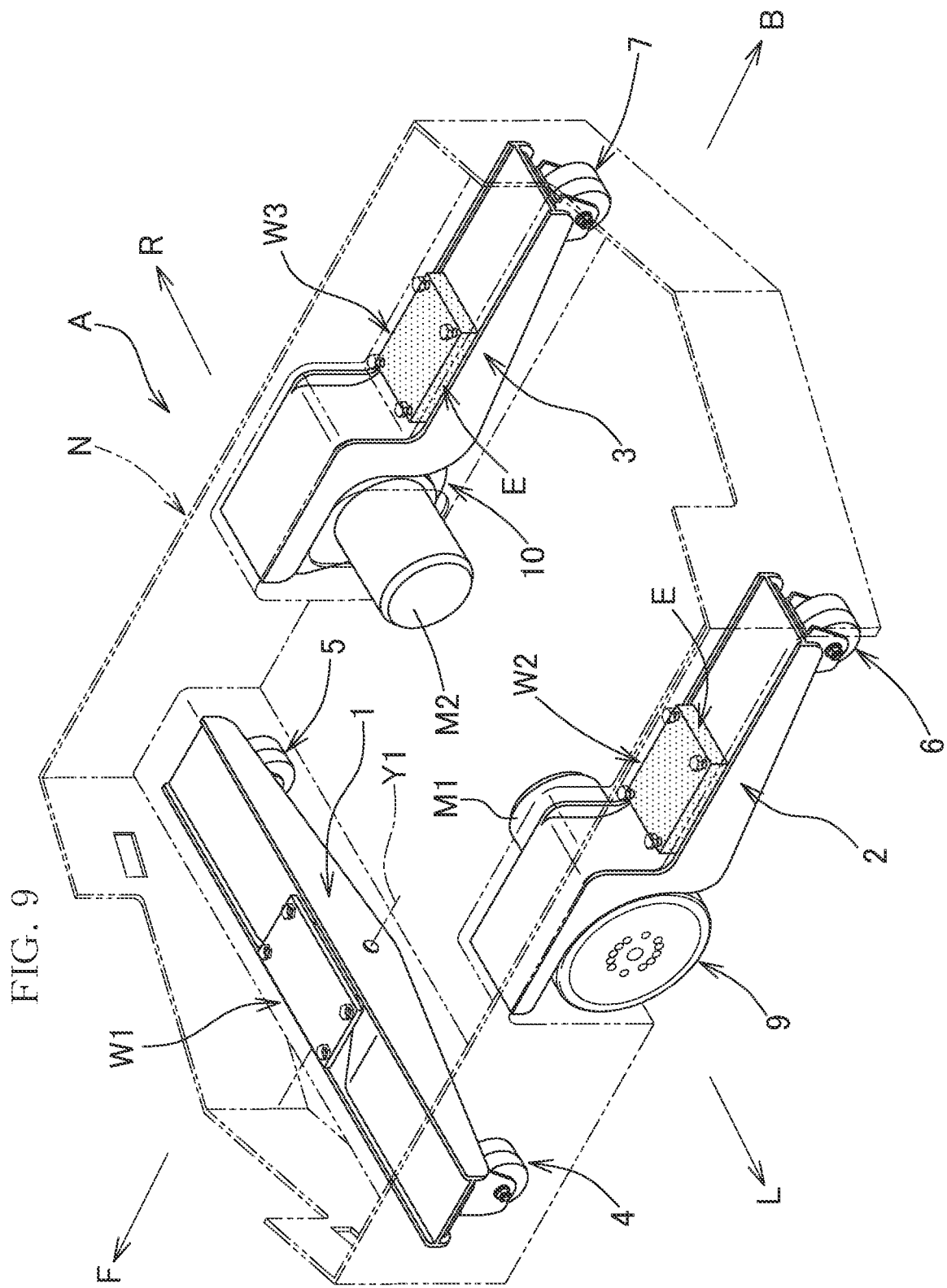
FIG. 9 is a perspective view showing a modified example of the second wheel section and the third wheel section.
Figure 10:
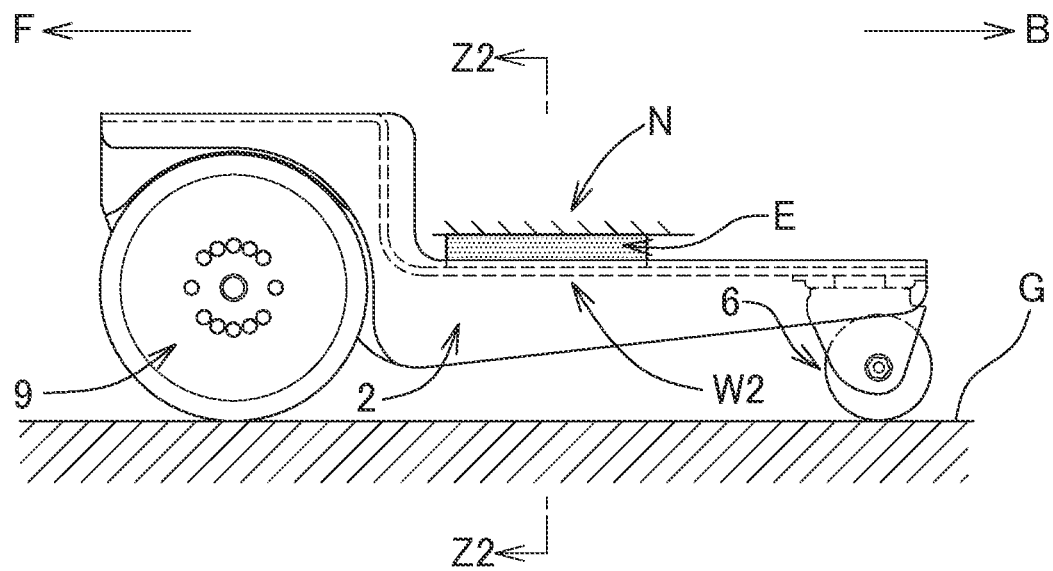
FIG. 10 is a right side view of the second wheel section shown in FIGS. 8 and 9.
Figure 11:
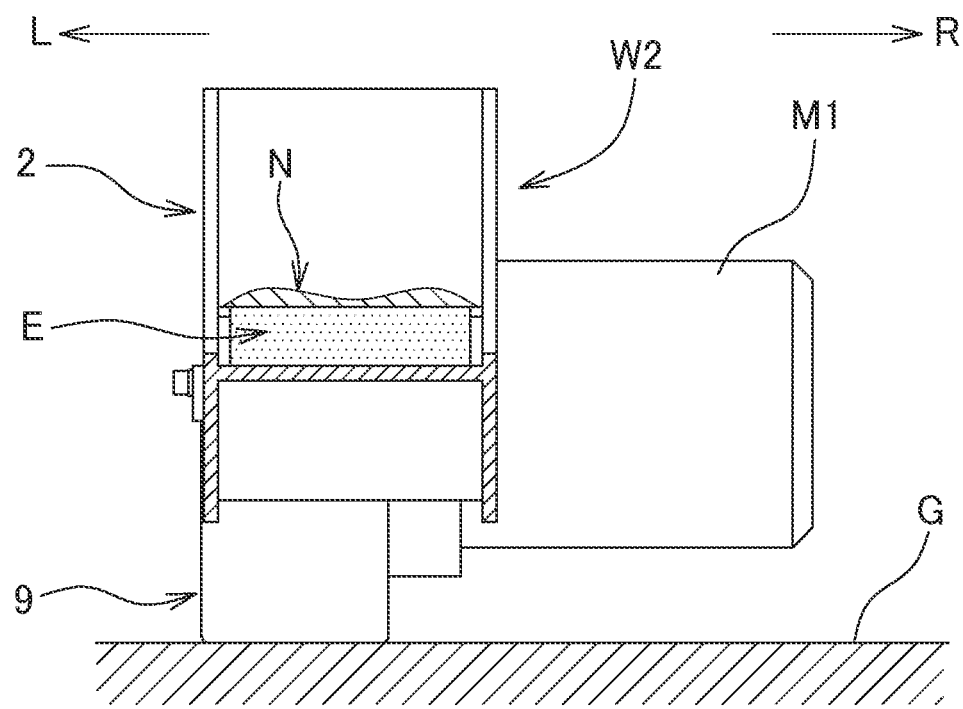
FIG. 11 is a cross-sectional view taken along an arrow Z2-Z2 in FIG. 10.

As shown in the perspective view of FIG. 8, the perspective view of FIG. 9, the right side view of FIG. 10, and the cross-sectional view of FIG. 11, the mechanism for supporting the front-rear frame body 2 of the second wheel section W2 so as to be biaxially swingable about the left-right axis X2 and the front-rear axis Y2 relative to the base N, and the mechanism for supporting the front-rear frame body 3 of the third wheel section W3 so as to be biaxially swingable about the left-right axis X3 and the front-rear axis Y3 relative to the base N may be elastic bodies E that are respectively provided between the base N and the front-rear frame bodies 2 and 3, and have a thick plate shape, for example.

The elastic body E is, for example, an elastomer that is a natural or synthetic resin having elastic properties, and can elastically return to its original shape after being subjected to tensile or compressive deformation. Examples of the elastomer include a thermoplastic elastomer (TPE), such as TPS (styrene-based elastomer), TPO (olefin-based elastomer), TPU (urethane-based elastomer), TPA (amide-based elastomer), and TPEE (ester-based elastomer), and a rubber material, such as nitrile rubber (NBR), hydrogenated nitrile rubber (HNBR), acrylic rubber (ACM), ethylene-acrylic rubber (AEM), fluorine rubber (FKM, FPM), silicone rubber (VQM), etc. The elastic body E is not limited to the elastomer, and may be composed of a plurality of mechanical springs.

The elastic body E is used as the mechanisms for supporting the front-rear frame bodies 2 and 3 in a biaxially singable manner, so that a manufacturing cost can be reduced with a simple structure, and vibration transmission from a road surface G to the base N can be prevented by a cushioning effect of the elastic body E.

<Modified Examples of Supporting Swivel Wheel of First Wheel Section in Biaxially Swingable Manner>

Figure 12:
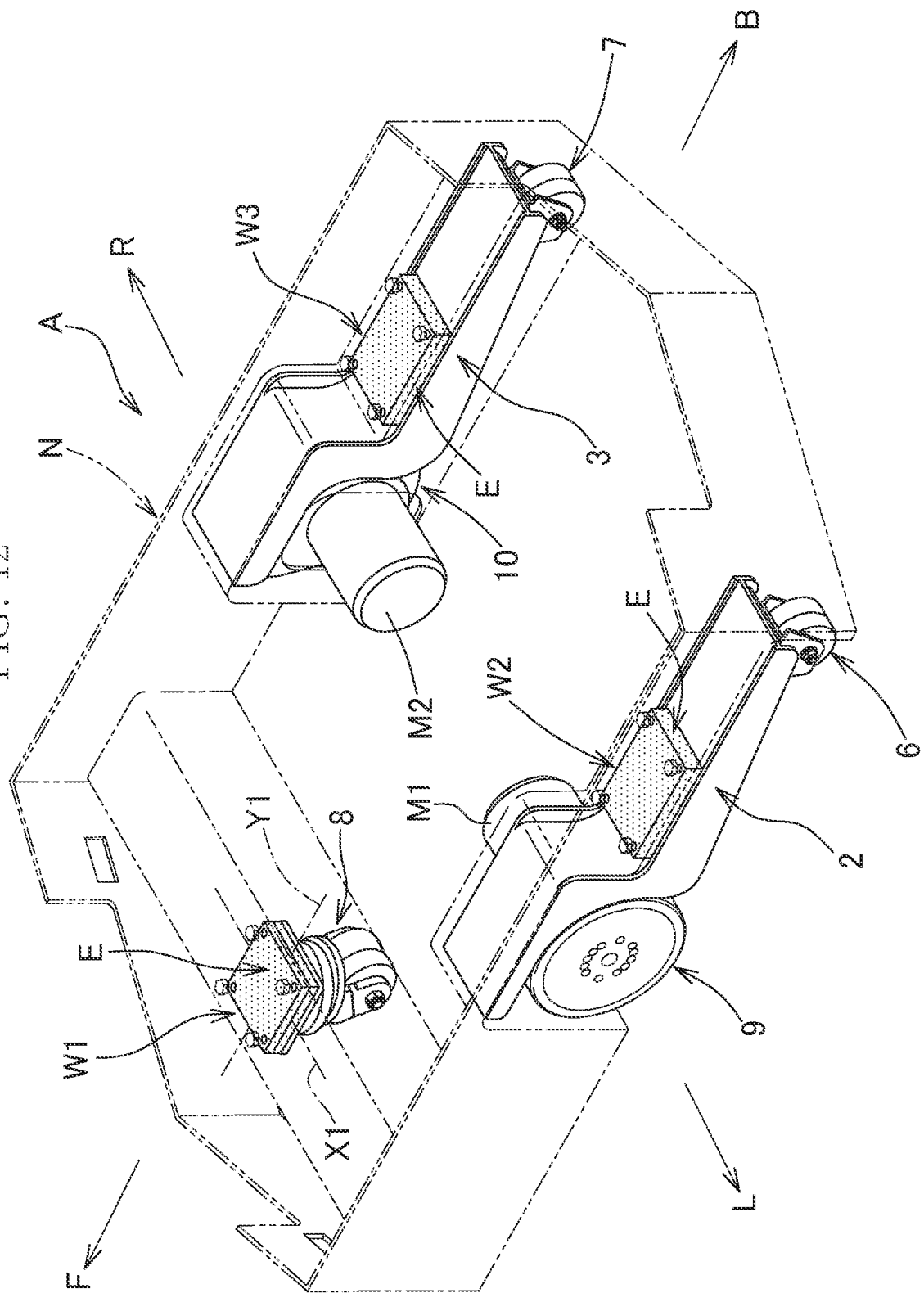
FIG. 12 is a perspective view showing an example of a configuration in which a swivel wheel of the first wheel section is supported so as to be swingable about two axes.

As shown in the perspective view of FIG. 12, the swivel wheel 8 of the first wheel section W1 may be supported by the elastic body E provided between the base N and the swivel wheel 8 in the biaxially swingable manner about the left-right axis X1 and the front-rear axis Y1.

Alternatively, in a configuration with the left-right frame body 1 as shown in the perspective view of FIG. 2, the intermediate position between the swivel wheels 4 and 5 in the left-right frame body 1 may be further supported so as to be swingable about the left-right axis X1 relative to the base N, by using a hinge that swings around the left-right axis X1, or an elastic body, for example.

The swivel wheel 8 or the left-right frame body 1 in the first wheel section W1 is swingably supported around the left-right axis X1, so as to allow the swivel wheel 8 or the swivel wheels 4 and 5 in the first wheel section W1 can swing about the left-right axis X1 relative to the base N.

Figure 13:
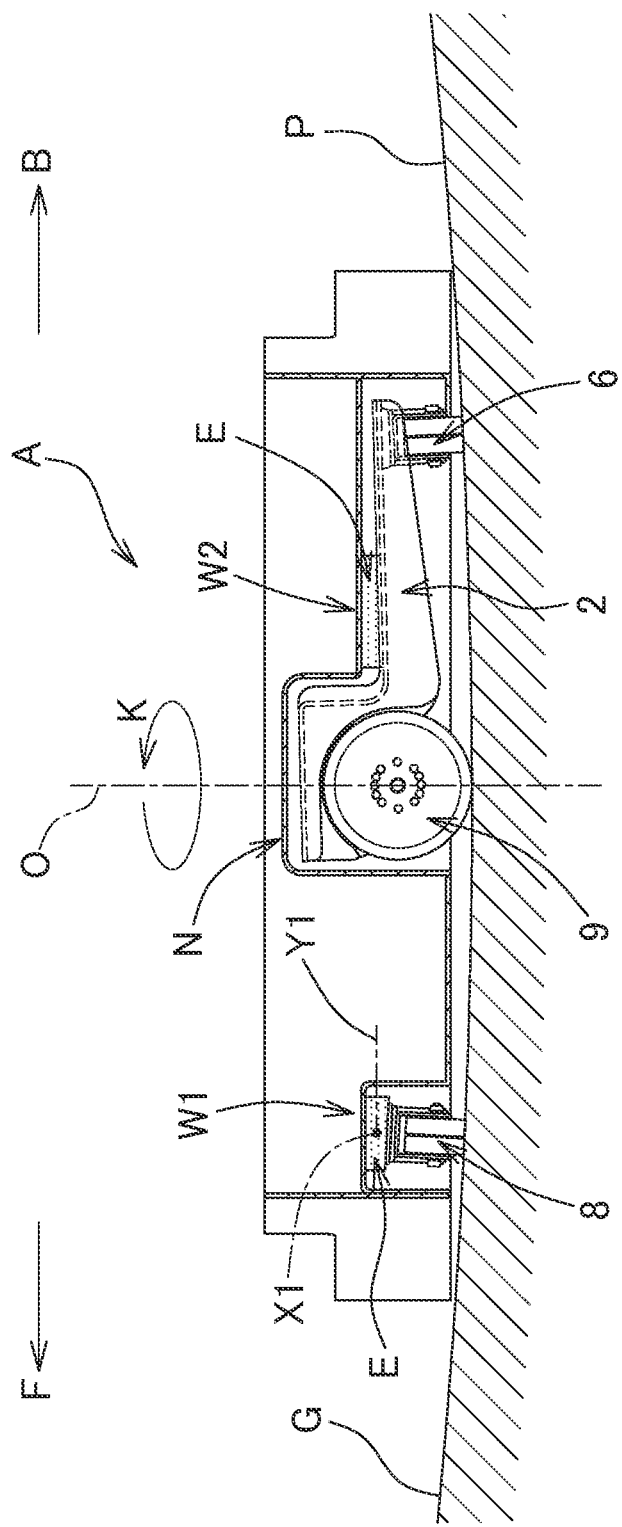
FIG. 13 is a partial cross-sectional right side view showing a state in which a guided vehicle shown in FIG. 12 is making a spin turn under a situation where a road surface is a spherically curved surface that is concave upward.

The guided vehicle A shown in FIG. 12 may perform a spin turn rotating about a vertical axis O of the base N as indicated by a rotation direction K in FIG. 13, for example, and the load surface G may be a spherical curved surface P concave upward, for example. Even in such a case, if the swivel wheel 8 of the first wheel section W1 is oriented in the left-right direction (a circumferential direction of the spin turn) in FIG. 13 during the spin turn, the swivel wheel 8 of the first wheel section W1 can be grounded along the spherically curved surface P.

In addition, the front-rear frame body 2 of the second wheel section W2 can swing about the left-right axis X2 and the front-rear axis Y2. Accordingly, the swivel wheel 6 to be oriented in the circumferential direction during the spin turn can be grounded along the spherical curved surface P as shown in FIG. 13. Similarly, the front-rear frame body 3 of the third wheel section W3 can swing about the left-right axis X3 and the front-rear axis Y3. Accordingly, the swivel wheel 7 to be oriented in the circumferential direction during the spin turn can also be grounded along the spherical curved surface P.

Therefore, a contact area of the swivel wheel 8 of the first wheel section W1 with the road surface G, and contact areas of the swivel wheel 6 of the second wheel section W2 and the swivel wheel 7 of the third wheel section W3 with the road surface G increase, so that sufficient ground contact is secured, allowing the guided vehicle A to perform a smooth spin turn.

<Description of Grounding of Wheel of Guided Vehicle According to Road Surface Condition>

(Front-Rear Frame Body Swings Around Left-Right Axis)

Figure 14:
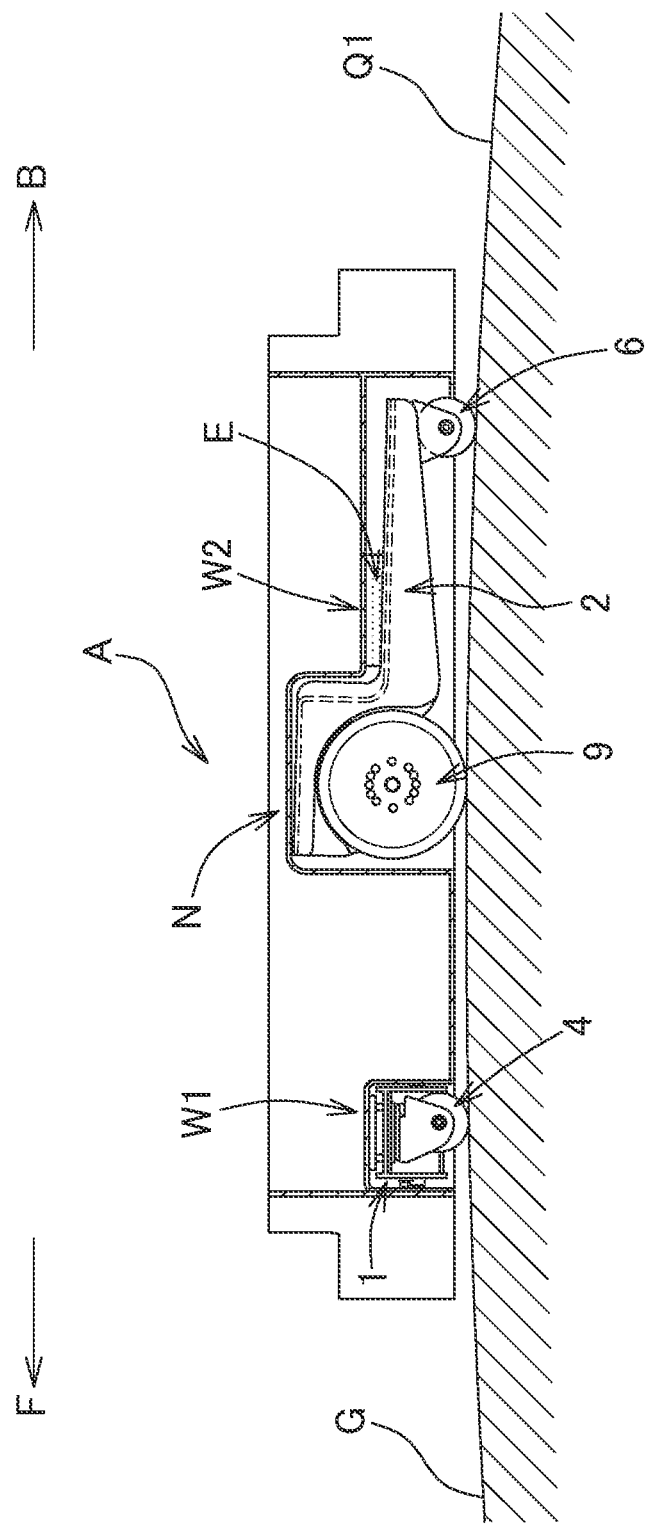
FIG. 14 is a partial cross-sectional right side view for describing an operation of the guided vehicle according to the embodiment of the present invention, and shows that a shape of the road surface, which is obtained by cutting along a vertical plane including a front-rear direction and is viewed in the left-right direction, is an arc-shaped cylindrical curved surface that is convex upward.

In the guided vehicle A according to the embodiment of the present invention, the front-rear frame bodies 2 and 3 of the second wheel section W2 and the third wheel section W3 can individually swing about the left-right direction axes X2 and X3 relative to the base N. Therefore, as shown in the partial cross-sectional right side view of FIG. 14, even if the guided vehicle A moves in the front-rear direction on the road surface G that is a cylindrical curved surface Q1 having an upwardly convex circular arc shape, when viewed in the left-right direction, obtained by cutting the road surface G along a vertical plane including the front-rear direction, the driving wheels 9 and 10 and swivel wheels 4 to 7 are grounded along the road surface G.

Figure 15:
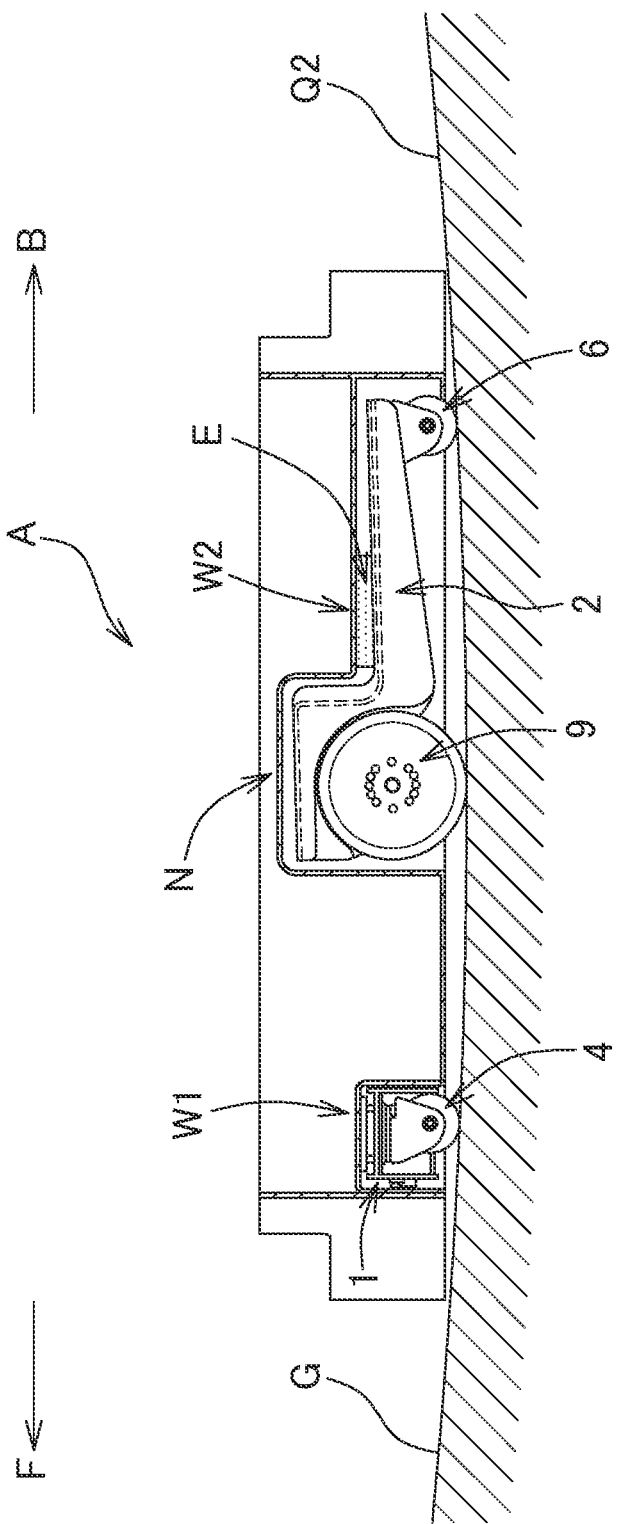
FIG. 15 is a partial cross-sectional right side view for describing the operation of the guided vehicle according to the embodiment of the present invention, and shows that the shape of the road surface, which is obtained by cutting along the vertical plane including the front-rear direction and is viewed in the left-right direction, is an arc-shaped cylindrical curved surface that is concave upward.

As shown in the partial cross-sectional right side view of FIG. 15, even if the guided vehicle A moves in the front-rear direction on the road surface G that is a cylindrical curved surface Q2 having an upwardly concave arc shape, when viewed in the left-right direction, obtained by cutting the road surface G along the vertical plane including the front-rear direction, the driving wheels 9 and 10 and swivel wheels 4 to 7 are grounded along the road surface G.

(Front-Rear Frame Body Swings Around Front-Rear Axis)

Figure 16:
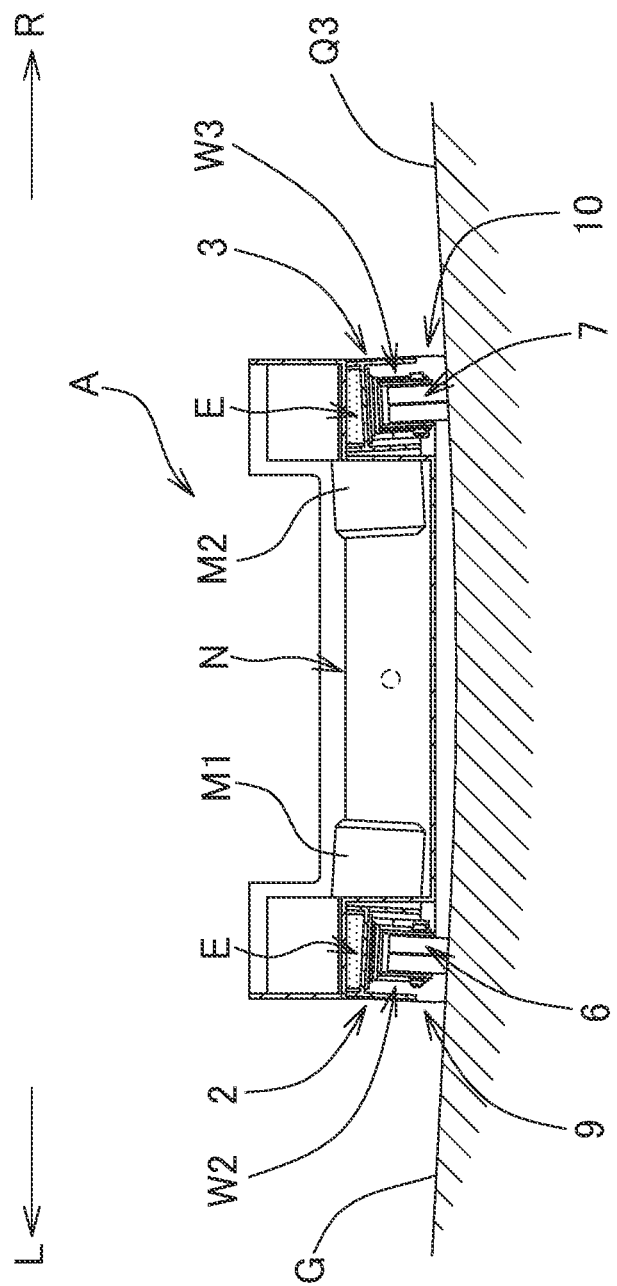
FIG. 16 is a partial cross-sectional rear view for describing the operation of the guided vehicle according to the embodiment of the present invention, and shows the shape of the road surface, which is obtained by cutting along a vertical plane including the left-right direction and is viewed from the front-rear direction, is an arc-shaped cylindrical curved surface that is concave upward.

In the guided vehicle A according to the embodiment of the present invention, the front-rear frame bodies 2 and 3 of the second wheel section W2 and the third wheel section W3 can swing individually around the front-rear axes Y2 and Y3 relative to the base N. Therefore, as shown in the partial cross-sectional rear side view of FIG. 16, even if the guided vehicle A moves in the front-rear direction on the road surface G that is a cylindrical curved surface Q3 having an upwardly concave arc shape, when viewed in the front-rear direction, obtained by cutting the road surface G along a vertical plane including the left-right direction, the driving wheels 9 and 10 and swivel wheels 6 to 7 are grounded along the road surface G.

Figure 17:
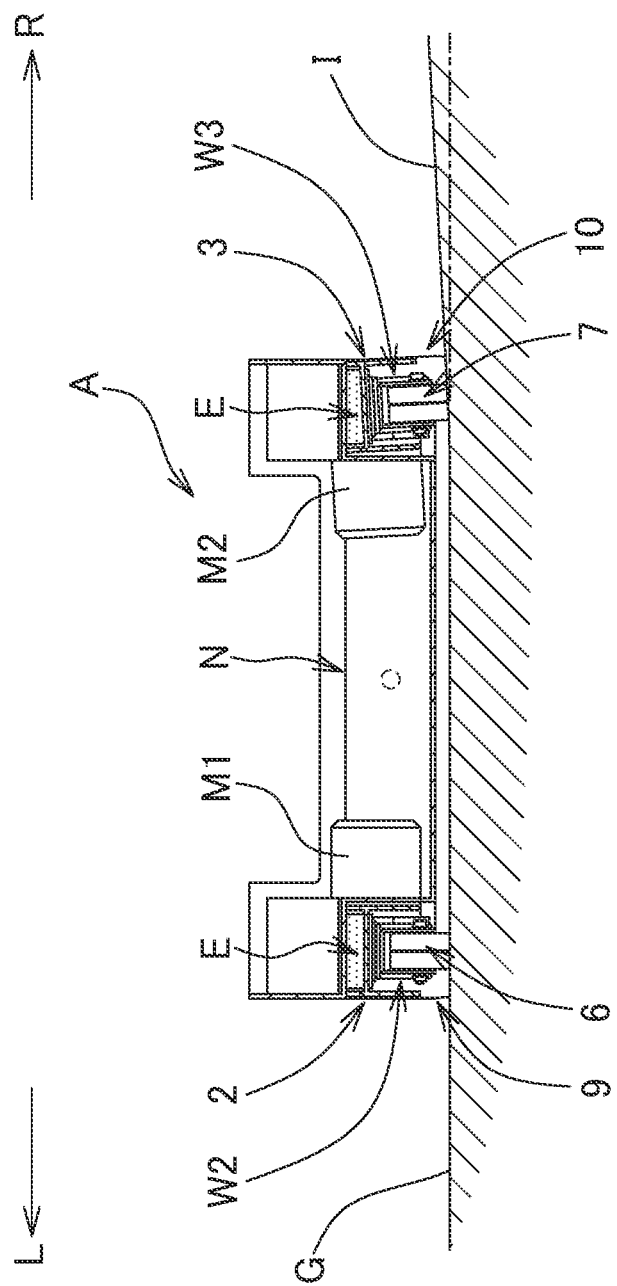
FIG. 17 is a partial cross-sectional rear view for describing the operation of the guided vehicle according to the embodiment of the present invention, and shows the shape of the road surface, which is obtained by cutting along the vertical plane including the left-right direction and is viewed in the front-rear direction, includes an inclined surface.

As shown in the partial cross-sectional rear view of FIG. 17, the shape of the road surface G may include an inclined surface I when the road surface G cut along the vertical plane including the left-right direction is viewed in the front-rear direction. Even in such a case, if the guided vehicle A moves in the front-rear direction with one of the left and right wheels, e.g., the driving wheel 10 and swivel wheel 7, being positioned on the inclined plane I, the driving wheel 9, the swivel wheel 6, the driving wheel 10, and the swivel wheel 7 are grounded along the road surface G.

Figure 18:
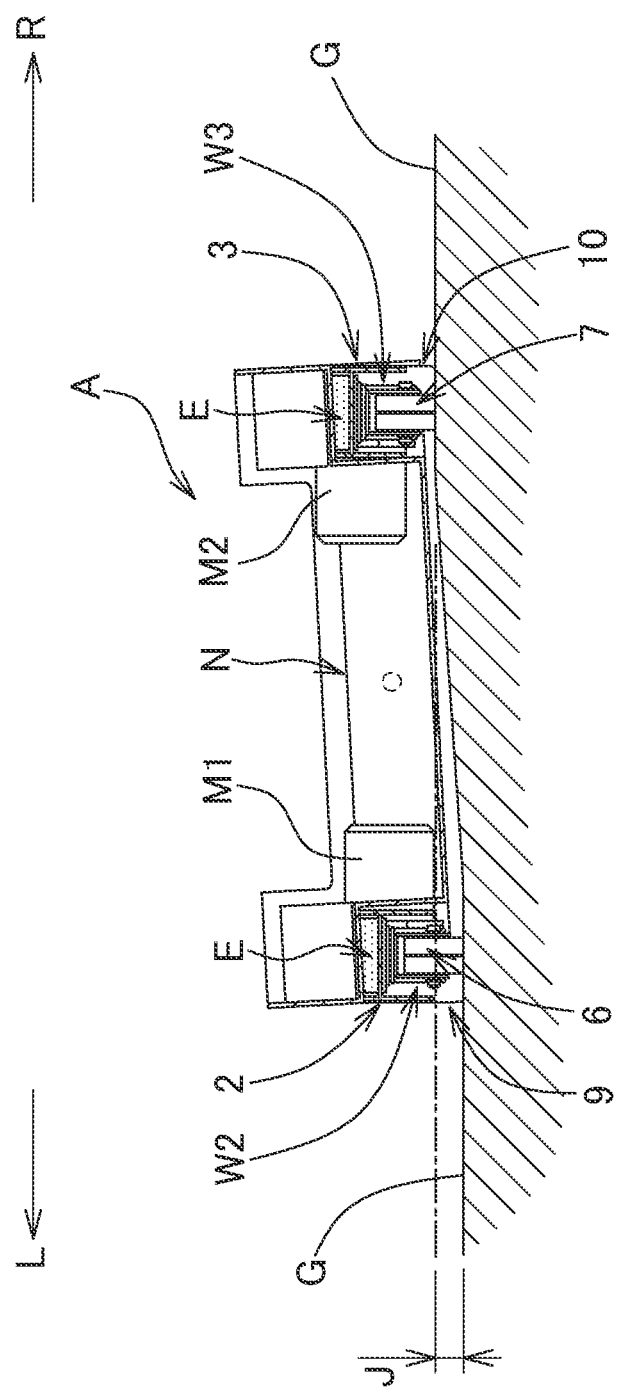
FIG. 18 is a partial cross-sectional rear view for describing the operation of the guided vehicle according to the embodiment of the present invention, and shows the shape of the road surface, which is obtained by cutting along the vertical plane including the left-right direction and is viewed in the front-rear direction, includes a step.

As shown in the partial cross-sectional rear view of FIG. 18, the shape of the road surface G may include a step J when the road surface G cut along the vertical plane including the left-right direction is viewed in the front-rear direction, and the left and right wheels may be respectively positioned on and below the step J. Even in such a case, if the guided vehicle A moves in the front-rear direction with the driving wheel 10 and the swivel wheel 7 being positioned on the step J and the driving wheel 9 and the swivel wheel 6 being positioned below the step J, the driving wheel 9, the swivel wheel 6, the driving wheel 10, and the swivel wheel 7 are grounded along the road surface G.

(Front-Rear Frame Bodies Each Swing about Left-Right Axis and Front-Rear Axis Simultaneously)

A shape of the road surface G, which is cut by a vertical plane including the front-rear direction and viewed from the left-right direction, may be an upwardly concave or convex circular arc shape. A shape of the road surface G, which is cut by a vertical plane including the left-right direction and viewed from the front-rear direction, may be an upwardly concave or convex circular arc shape. Even if the guided vehicle A moves in the front-rear direction on such a road surface G, the driving wheels 9 and 10 and the swivel wheels 4 to 7 are grounded along the road surface G. Even if the guided vehicle A moves in the front-rear direction on the road surface G having such various shapes, the driving wheels 9 and 10 and the swivel wheels 4 to 7 are grounded along the road surface G.

As described above, according to the guided vehicle A of the embodiment of the present invention, the front-rear frame bodies 2 and 3 of the second wheel section W2 and the third wheel section W3 can swing independently around the left-right axes X2 and X3 relative to the base N. Accordingly, even if an inclined surface or an undulation, which is displaced in the front-rear direction, is locally generated on the road surface G, the driving wheels 9 and 10 and the swivel wheels 6 and 7 of the second wheel section W2 and the third wheel section W3 can be grounded along the road surface G. Therefore, contact areas of the driving wheels 9 and 10 and the swivel wheels 6 and 7 of the second wheel section W2 and the third wheel section W3 with the road surface G increase, and sufficient ground contact is ensured, thereby allowing the guided vehicle A to smoothly run.

In addition, the front-rear frame bodies 2 and 3 of the second wheel section W2 and the third wheel section W3 can individually swing about the front-rear axes Y2 and Y3 relative to the base N. Therefore, even if the road surface G is locally inclined or undulated in the left-right direction, the driving wheels 9 and 10 and the swivel wheels 6 and 7 of the second wheel section W2 and the third wheel section W3 can be grounded along the road surface G. Therefore, the contact areas of the driving wheels 9 and 10 and the swivel wheels 6 and 7 of the second wheel section W2 and the third wheel section W3 with the road surface G increase, and sufficient ground contact is ensured, thereby allowing the guided vehicle A to smoothly run.

According to the above-described structure in which the contact areas of the driving wheels 9 and 10 and the swivel wheels 4 to 8 with the road surface G can increase, uneven wear of the driving wheels 9 and 10 and the swivel wheels 4 to 8 can be prevented and driving force can be reliably transmitted from the wheels 9 and 10 to the road surface G. Furthermore, the contact areas of the driving wheels 9 and 10 and the swivel wheels 4 to 8 with the road surface G increase, thereby preventing wobbling of the guided vehicle A caused by the guided vehicle A losing its balance while traveling.

Figure 19:
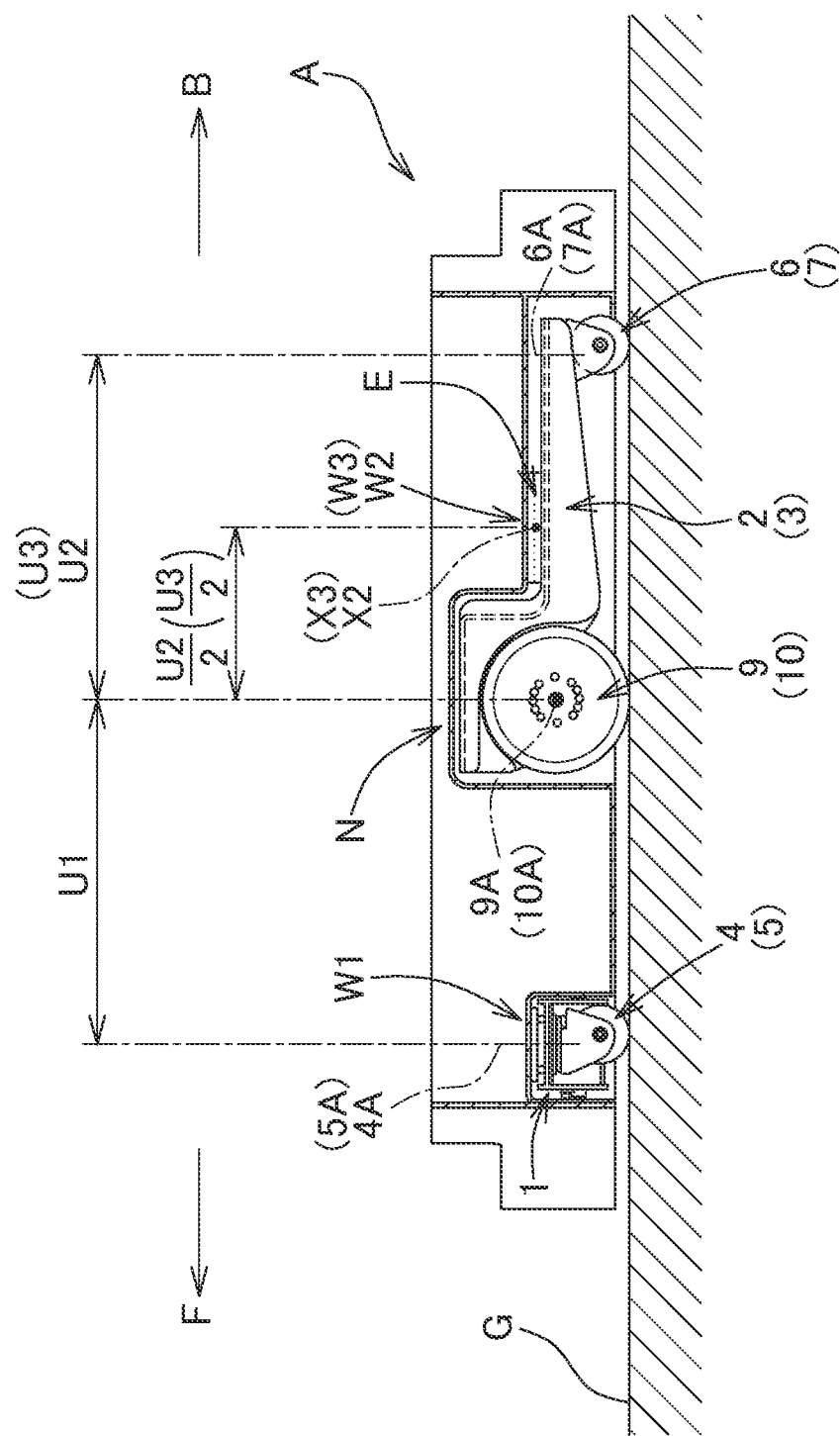
FIG. 19 is a partial cross-sectional right side view for describing equalization of a load with six wheels on the guided vehicle.

In the embodiment of the present invention as described above, in the guided vehicle A provided with six wheels, i.e., the driving wheels 9 and 10 and the swivel wheels 4 to 7, as shown in FIGS. 2 and 9, for example, a configuration that can achieve equalization of the load with six wheels may be adopted. FIG. 19 shows a partial cross-sectional right side view for describing the equalization of the load with six wheels in the guided vehicle A.

With reference to FIGS. 9 and 19, a distance in the front-rear direction between vertical support axes 4A and 5A of the swivel wheels 4 and 5 of the first wheel section W1 and rotation center axes 9A and 10A of the driving wheels 9 and 10 of the second wheel section W2 and the third wheel section W3 is U1. A distance in the front-rear direction between the rotation center axis 9A of the driving wheel 9 of the second wheel section W2 and a vertical support axis 6A of the swivel wheel 6 of the second wheel section W2 is U2. A distance in the front-rear direction between the rotation center axis 10A of the driving wheel 10 of the third wheel section W3 and a vertical support axis 7A of the swivel wheel 7 of the third wheel section W3 is U3.

In FIG. 19, it is assumed that U1=U2=U3. A center or the vicinity of the center in the front-rear direction between the rotation center axes 9A and 10A of the driving wheels 9 and 10 and the vertical support axes 6A and 7A of the swivel wheels 6 and 7 of the front-rear frame bodies 2 and 3 is supported so as to be swingable about the left-right axes X2 and X3 and the front-rear axes Y2 and Y3 relative to the base N. For example, a distance in the front-rear direction between the rotation center axis 9A of the driving wheel 9 and the left-right axis X2 is set to U2/2, and a distance in the front-rear direction between the rotation center axis 10A of the driving wheel 10 and the left-right axis X3 is set to U3/2.

Assuming that a total load applied to the six wheels of the guided vehicle A is V, one sixth of the total load V is applied to each of the swivel wheels 4 to 7 and the driving wheels 9 and 10. Generally, a friction coefficient between each of the driving wheels 9, 10 and the road surface G is 0.5 to 0.6. Meanwhile, rolling resistance between each of the swivel wheels 4 to 7 and the road surface G is 0.1 or less. Accordingly, the rolling resistance is set to 0.1.

Normal force of the driving wheels 9 and 10 is expressed by:

$$(1/3)V = \text{total load } V/\text{all six wheels} \times \text{two driving wheels}.$$

Running thrust of the guided vehicle A is expressed by: the normal force of the driving wheels 9 and 10×a coefficient of the friction between the driving wheels 9, 10 and the road surface G (0.5 to 0.6).

Therefore, the running thrust of the guided vehicle A is expressed by:

$(1/3)V×(0.5 \text{ to } 0.6)=(1/6 \text{ to } 1/5)V.$

Running resistance of the guided vehicle A is expressed by:

total load $V$/all six wheels×four swivel wheels×0.1= $(1/15)V.$

From the above, the running thrust of the guided vehicle A is (1/6 to 1/5)/(1/15) times, i.e., 2.5 to 3 times, the running resistance of the guided vehicle A. Therefore, the driving wheels 9 and 10 can transmit the driving force to the road surface G without slipping, regardless of the presence or absence of a load on the lift table T (FIG. 1). If the load is evenly or substantially evenly applied to the six wheels, a load applied to the two driving wheels will be smaller than a load applied to the four swivel wheels as a whole. However, the two driving wheels can transmit the necessary driving force to the road surface G.

The guided vehicle A having six wheels, i.e., the driving wheels 9, 10 and swivel wheels 4 to 7, as shown in FIGS. 2 and 9, is different from the guided vehicle 10 of PTL 1. As described above, the guided vehicle A is provided with the left-right frame body 1 and the front-rear frame bodies 2 and 3. An intermediate position between the swivel wheel 4 and the swivel wheel 5 in the left-right frame body 1 is supported so as to be swingable about the front-rear axis Y1 relative to the base N. An intermediate position between the driving wheel 9 and the swivel wheel 6 in the front-rear frame body 2 is supported so as to be swingable about the left-right axis X2 and the front-rear axis Y2 relative to the base N. An intermediate position between the driving wheel 10 and the swivel wheel 7 in the front-rear frame body 3 is supported so as to be swingable about the left-right axis X3 and the front-rear axis Y3 relative to the base N.

With this structure, the guided vehicle A can travel on the road surface G with none of the six wheels floating above the road surface G, thereby ensuring ground contact. In FIG. 19, the guided vehicle A can drive while the load is evenly or substantially evenly applied to the six wheels, by setting U1=U2=U3, or U1=U2=U3.

Conventionally, due to the influence of undulations of the road surface G, an entire load might have been received only by two diagonal wheels as swivel wheels, for example. Accordingly, it has been necessary to use swivel wheels having a minimum allowable load. On the other hand, in the configuration of the guided vehicle A according to the present invention, the load can be evenly or substantially evenly applied to the six wheels. Accordingly, the load on the swivel wheels 4 to 7 can be reduced, and the driving wheels 9 and 10 are not overloaded. Therefore, the swivel wheels 4 to 7 and the driving wheels 9 and 10, which have a minimum allowable load can be used, so that the cost of the wheels can be reduced.

The above description of the embodiments are all examples, and thus the present invention is not limited thereto. Various improvements and modifications can be applied to the present invention without departing from the scope of the present invention.

The invention claimed is:

1. A guided vehicle provided with left and right driving wheels, the guided vehicle comprising:

a first wheel section located at a front end portion or a rear end portion of a base of the guided vehicle; and a second wheel section and a third wheel section that are independently located on left and right of the base, the second wheel section and the third wheel section being located rearward or frontward of the first wheel section, wherein the first wheel section includes:

one or a plurality of swivel wheels located at a center of the base in a left-right direction, each of the swivel wheels being a driven wheel, each of the second wheel section and the third wheel section includes:

a front-rear frame body extending in a front-rear direction;

a driving wheel arranged at a front portion or a rear portion of the front-rear frame body; and a swivel wheel arranged at the rear portion or the front portion of the front-rear frame body, the swivel wheel being a driven wheel, an intermediate position between the driving wheel and the swivel wheel in the front-rear frame body is supported to be swingable about a left-right axis and a front-rear axis relative to the base.

2. The guided vehicle according to claim 1, wherein each of the swivel wheels of the first wheel section is supported to be swingable about the left-right axis relative the base.

3. The guided vehicle according to claim 1, wherein a mechanism that supports the intermediate position between the driving wheel and the swivel wheel in the front-rear frame body to be swingable about the left-right axis and the front-rear axis relative to the base includes a first hinge that swings about the left-right axis and a second hinge that swings about the front-rear axis, the first hinge and the second hinge being provided between the base and the front-rear frame body.

4. The guided vehicle according to claim 1, wherein a mechanism that supports the intermediate position between the driving wheel and the swivel wheel in the front-rear frame body to be swingable about the left-right axis and the front-rear axis relative to the base includes an elastic body provided between the base and the front-rear frame body.

5. A guided vehicle provided with left and right driving wheels, the guided vehicle comprising:

a first wheel section located at a front end portion or a rear end portion of a base of the guided vehicle; and a second wheel section and a third wheel section that are independently located on left and right sides of the base, the second wheel section and the third wheel section being located rearward or frontward of the first wheel section, wherein the first wheel section includes:

a left-right frame body extending in a left-right direction; and a pair of swivel wheels arranged at left and right portions of the left-right frame body, each of the swivel wheels being a driven wheel;

an intermediate position between the swivel wheel at the left portion and the swivel wheel at the right portion in the left-right frame body is supported to be swingable about a front-rear axis relative to the base;

each of the second wheel section and the third wheel section includes:

a front-rear frame body extending in a front-rear direction;

a driving wheel arranged at a front portion or a rear portion of the front-rear frame body; and
a swivel wheel arranged at the rear portion or the front portion of the front-rear frame body, the swivel wheel being a driven wheel,
an intermediate position between the driving wheel and the swivel wheel in the front-rear frame body is supported to be swingable about a left-right axis and the front-rear axis relative to the base.

6. The guided vehicle according to claim 5, wherein
an intermediate position between the swivel wheel at the left portion and the swivel wheel at the right portion in the left-right frame body is supported to be further swingable about the left-right axis relative to the base.

7. The guided vehicle according to claim 5, wherein
a mechanism that supports the intermediate position between the driving wheel and the swivel wheel in the front-rear frame body to be swingable about the left-right axis and the front-rear axis relative to the base includes a first hinge that swings about the left-right axis and a second hinge that swings about the front-rear axis, the first hinge and the second hinge being provided between the base and the front-rear frame body.

8. The guided vehicle according to claim 5, wherein
a mechanism that supports the intermediate position between the driving wheel and the swivel wheel in the front-rear frame body to be swingable about the left-right axis and the front-rear axis relative to the base includes an elastic body provided between the base and the front-rear frame body.

9. The guided vehicle according to claim 5, wherein
length of the left-right frame body in the left-right direction is shorter than an interval in the left-right direction between the front-rear frame body of the second wheel section and the front-rear frame body of the third wheel section.

10. The guided vehicle according to claim 5, wherein:
the driving wheel of the second wheel section and the driving wheel of the third wheel section are positioned approximately at a center of the base in the front-rear direction;
a first distance, a second distance, and a third distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the third distance being between a vertical support axis of the swivel wheel of the first wheel section and the rotation center axis of the driving wheel of each of the second wheel section and the third wheel section, in the front-rear direction; and
a center or a vicinity of the center in the front-rear direction between the rotation center axis of the driving wheel and the vertical support axis of the swivel wheel in the front-rear frame body is supported to be swingable about the left-right axis and the front-rear axis relative to the base.

11. The guided vehicle according to claim 5, wherein
the swivel wheel of the second wheel section and the swivel wheel of the third wheel section are positioned approximately at a center of the base in the front-rear direction;
a first distance, a second distance, and a fourth distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the fourth distance being between a vertical support axis of the swivel wheel of the first wheel section and the vertical support axis of the swivel wheel of each of the second wheel section and the third wheel section, in the front-rear direction; and
a center or a vicinity of the center in the front-rear direction between the rotation center axis of the driving wheel and the vertical support axis of the swivel wheel in the front-rear frame body is supported to be swingable about the left-right axis and the front-rear axis relative to the base.

12. The guided vehicle according to claim 6, wherein
the driving wheel of the second wheel section and the driving wheel of the third wheel section are positioned approximately at a center of the base in the front-rear direction;
a first distance, a second distance, and a third distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the third distance being between a vertical support axis of the swivel wheel of the first wheel section and the rotation center axis of the driving wheel of each of the second wheel section and the third wheel section, in the front-rear direction; and
a center or a vicinity of the center in the front-rear direction between the rotation center axis of the driving wheel and the vertical support axis of the swivel wheel in the front-rear frame body is supported to be swingable about the left-right axis and the front-rear axis relative to the base.

13. The guided vehicle according to claim 6, wherein
the swivel wheel of the second wheel section and the swivel wheel of the third wheel section are positioned approximately at a center of the base in the front-rear direction;
a first distance, a second distance, and a fourth distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the fourth distance being between the vertical support axis of the swivel wheel of the first wheel section and the vertical support axis of the swivel wheel of each of the second wheel section and the third wheel section, in the front-rear direction; and a center or a vicinity of the center in the front-rear direction between the rotation center axis of the driving wheel and the vertical support axis of the swivel wheel in the front-rear frame body is supported to be swingable about the left-right axis and the front-rear axis relative to the base.

14. The guided vehicle according to claim 7, wherein
the driving wheel of the second wheel section and the driving wheel of the third wheel section are positioned approximately at a center of the base in the front-rear direction;
a first distance, a second distance, and a third distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the third distance being between a vertical support axis of the swivel wheel of the first wheel section and the rotation center axis of the driving wheel of each of the second wheel section and the third wheel section, in the front-rear direction; and
a center or a vicinity of the center in the front-rear direction between the rotation center axis of the driving wheel and the vertical support axis of the swivel wheel in the front-rear frame body is supported to be swingable about the left-right axis and the front-rear axis relative to the base.

15. The guided vehicle according to claim 7, wherein
the swivel wheel of the second wheel section and the swivel wheel of the third wheel section are positioned approximately at a center of the base in the front-rear direction;
a first distance, a second distance, and a fourth distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the fourth distance being between the vertical support axis of the swivel wheel of the first wheel section and the vertical support axis of the swivel wheel of each of the second wheel section and the third wheel section, in the front-rear direction; and
a center or a vicinity of the center in the front-rear direction between the rotation center axis of the driving wheel and the vertical support axis of the swivel wheel in the front-rear frame body is supported to be swingable about the left-right axis and the front-rear axis relative to the base.

16. The guided vehicle according to claim 8, wherein
the driving wheel of the second wheel section and the driving wheel of the third wheel section are positioned approximately at a center of the base in the front-rear direction;
a first distance, a second distance, and a third distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the third distance being between a vertical support axis of the swivel wheel of the first wheel section and the rotation center axis of the driving wheel of each of the second wheel section and the third wheel section, in the front-rear direction; and
a center or a vicinity of the center in the front-rear direction between the rotation center axis of the driving wheel and the vertical support axis of the swivel wheel in the front-rear frame body is supported to be swingable about the left-right axis and the front-rear axis relative to the base.

17. The guided vehicle according to claim 8, wherein
the swivel wheel of the second wheel section and the swivel wheel of the third wheel section are positioned approximately at a center of the base in the front-rear direction;
a first distance, a second distance, and a fourth distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the fourth distance being between the vertical support axis of the swivel wheel of the first wheel section and the vertical support axis of the swivel wheel of each of the second wheel section and the third wheel section, in the front-rear direction; and
a center or a vicinity of the center in the front-rear direction between the rotation center axis of the driving wheel and the vertical support axis of the swivel wheel in the front-rear frame body is supported to be swingable about the left-right axis and the front-rear axis relative to the base.

18. The guided vehicle according to claim 9, wherein
the driving wheel of the second wheel section and the driving wheel of the third wheel section are positioned approximately at a center of the base in the front-rear direction;
a first distance, a second distance, and a third distance are identical or nearly identical,
the first distance being between a rotation center axis of the driving wheel of the second wheel section and a vertical support axis of the swivel wheel of the second wheel section, in the front-rear direction,
the second distance being between a rotation center axis of the driving wheel of the third wheel section and a vertical support axis of the swivel wheel of the third wheel section, in the front-rear direction, and
the third distance being between a vertical support axis of the swivel wheel of the first wheel section and the rotation center axis of the driving wheel of each of the second wheel section and the third wheel section, in the front-rear direction; and
a center or a vicinity of the center in the front-rear direction between the rotation center axis of the driving wheel and the vertical support axis of the swivel wheel in the front-rear frame body is supported to be swingable about the left-right axis and the front-rear axis relative to the base.

19. The guided vehicle according to claim 9, wherein the swivel wheel of the second wheel section and the swivel wheel of the third wheel section are positioned approximately at a center of the base in the front-rear direction;

a first distance, a second distance, and a fourth distance are identical or nearly identical, the first distance being between a rotation center axis of the driving wheel of the second wheel section and a vertical support axis of the swivel wheel of the second wheel section, in the front-rear direction, the second distance being between a rotation center axis of the driving wheel of the third wheel section and a vertical support axis of the swivel wheel of the third wheel section, in the front-rear direction, and the fourth distance being between the vertical support axis of the swivel wheel of the first wheel section and the vertical support axis of the swivel wheel of each of the second wheel section and the third wheel section, in the front-rear direction; and a center or a vicinity of the center in the front-rear direction between the rotation center axis of the driving wheel and the vertical support axis of the swivel wheel in the front-rear frame body is supported to be swingable about the left-right axis and the front-rear axis relative to the base.

* * * * *